(12) United States Patent
Nakano et al.

(10) Patent No.: US 7,239,305 B1
(45) Date of Patent: Jul. 3, 2007

(54) INFORMATION PROCESSING SYSTEM AND SCREEN DISPLAY METHOD

(75) Inventors: Ichiro Nakano, Tokyo (JP); Seiichi Ito, Nagaoaka (JP)

(73) Assignee: Fujitsu Limited, Kawasaki (JP)

( * ) Notice: Subject to any disclaimer, the term of this patent is extended or adjusted under 35 U.S.C. 154(b) by 320 days.

(21) Appl. No.: 09/653,360

(22) Filed: Aug. 31, 2000

(30) Foreign Application Priority Data

Oct. 14, 1999 (JP) ................................. 11-292527

(51) Int. Cl.
*G09G 5/00* (2006.01)
(52) U.S. Cl. ...................................... 345/179; 345/173
(58) Field of Classification Search ..................... 345/7, 345/1.1, 173–183, 156; 353/122
See application file for complete search history.

(56) References Cited

U.S. PATENT DOCUMENTS

| | | | | |
|---|---|---|---|---|
| 5,428,417 | A | * | 6/1995 | Lichtenstein ................. 353/122 |
| 5,448,263 | A | * | 9/1995 | Martin ......................... 345/173 |
| 5,528,263 | A | * | 6/1996 | Platzker et al. ............. 345/156 |
| 5,539,429 | A | * | 7/1996 | Yano et al. .................. 345/173 |
| 5,815,142 | A | | 9/1998 | Allard et al. |
| 6,088,023 | A | * | 7/2000 | Louis et al. ................. 345/173 |
| 6,088,481 | A | * | 7/2000 | Okamoto et al. ............ 382/189 |
| 6,215,479 | B1 | * | 4/2001 | Matsui ......................... 345/173 |
| 6,380,929 | B1 | * | 4/2002 | Platt ............................ 345/173 |
| 6,492,977 | B1 | * | 12/2002 | Marshall ...................... 345/168 |

FOREIGN PATENT DOCUMENTS

| | | |
|---|---|---|
| EP | 0828211 A2 | 3/1998 |
| JP | 09-297656 | 11/1997 |

OTHER PUBLICATIONS

Japanese Action mailed Jan. 30, 2007 for corresponding Japanese Patent Application No. 11-292527.

* cited by examiner

*Primary Examiner*—Kevin M. Nguyen
(74) *Attorney, Agent, or Firm*—Staas & Halsey LLP

(57) ABSTRACT

Disclosed are a method of and a system for displaying information in such a way that an audience is able to follow up with an operation of an operator in demonstration and presentation using a information terminal, etc. including a touch panel, etc. as an I/O device. An information processing system comprises an operation screen unit capable of displaying information and detecting a touch operation on a surface thereof, a first display control unit for controlling display of the information on the operation screen unit, and an operation mode selecting unit for selecting any one of two or more operation modes with respect to the touch operation. A first operation mode provides the touch operation on the operation screen unit with a first function corresponding to the touch operation, and a second operation mode provides the touch operation on the operation screen unit, instead of providing the first function corresponding to the touch operation, or together with providing the first function, with a second function of displaying a marker for indicating a detection of the touch in a touch position.

24 Claims, 19 Drawing Sheets

INFORMATION PROCESSING SYSTEM AND SCREEN DISPLAY METHOD

BACKGROUND OF THE INVENTION

The present invention relates to an information processing system including input/output (I/O) devices such as a touch panel, a mouse, etc. capable of inputting information with an operation against a display on a screen.

In the information processing system including the above-described I/O devices like, e.g., the touch panel, a sensor for detecting a touch (or press-down) on a screen from outside is provided in overlap with a touch panel display screen for displaying the information. When an operator of the information processing system presses down a position of a button, etc. displayed on the screen, the sensor detects coordinates of that touch position, and an operation instruction is given to the information processing system.

This type of invention known as the information processing system is disclosed in Japanese Patent Laying-Open Application No.9-26832. This type of information processing system includes a large-sized main LCD having high resolution, a main CPU for controlling the main LCD, a small-sized sub LCD having low resolution, a touch panel on the sub LCD, and a sub CPU for controlling the sub LCD. According to this invention, a necessity for providing the touch panel on the main LCD is eliminated by combining the small-sized low resolution sub LCD with the touch panel provided on the sub LCD, and declines both in contrast of the main LCD and in display function are thereby prevented. Further, this invention has a scheme for reducing a consumption of electric power by operating only the sub LCD and a sub processor in operations not requiring the high resolution.

Further, in some other conventional information processing systems, both of the touch panel and another pointing device, e.g., the mouse can be used as the pointing devices. In this type of information processing system, when detecting that the operator manipulates the mouse, a mouse cursor is displayed on the screen, and, when detecting that the operator operates the touch panel, the mouse cursor is not displayed.

The reason for taking a mode in which the mouse cursor is not displayed when operating the touch panel, is that the operator is able to directly specify desired coordinates on the screen by use of a finger or a pen.

In the case of performing the demonstration and the presentation by operating the touch panel in this information processing system, however, the audience is unable to follow up with the operation of the operator and hard to understand how the operator operates it.

Further, this type of information processing system may generally be a small-sized information terminal such as a notebook type personal computer, a pen-inputting type personal computer, a PDA, etc., and an area of a display screen thereof is small in general. Therefore, other external display device such as a liquid crystal projector or a large-screen CRT is connected via a cable, and the demonstration or the presentation is conducted for the audiences by use of this external display device in many cases. In this case, if a video controller incorporated into the information processing system is used for controlling display on the external display device, the same content as that displayed on the external display device can not be displayed on the screen of the self-device in some cases in terms of a limit of performance of the video controller. Hence, the operator must operate the touch panel in a state of displaying nothing on the screen of the information processing system, and it is difficult to pinpoint the exact coordinates on the screen by operating the touch panel.

Further, other type of information processing system incorporates two pieces of video controllers. One of the two video controllers controls the display on the touch panel screen, while the other controller controls the display on the external display device. Therefore, this information processing system displays different contents on the two screens. In this type of information processing system, it is difficult to specify a menu, a button or an icon by use of the touch panel because they are displayed on the external display device but are not displayed on the touch panel.

In any case, the audiences have been demanding for a contrivance for pinpointing the touched coordinates to make the operation clearly understandable irrespective of whether the information is displayed on the touch panel or not.

On the other hand, the operators have been demanding for a method of controlling the information processing system by use of a touch panel capable of easily operating the menu, the button or the icon displayed on only the external display device.

Moreover, in an information processing system having no such touch panel described above and using only, e.g., a mouse as a pointing device, a mouse cursor is always displayed on the screen.

In the demonstration and the presentation for the audience, however, the operator frequently moves the mouse cursor to the desired menu, button or icon, and hence it is difficult for the audience to grasp the operation by the operator as in the case of the information processing system including the touch panel described above.

Accordingly, the contrivance for making the content of operation by the operator easily understandable to the audience, is also required of the information processing system using a pointing device other than the touch panel.

SUMMARY OF THE INVENTION

It is a primary object of the present invention, which was devised to obviate the problems inherent in the prior arts, to provide an information processing system, a display control method and a recording medium recorded with a program for an execution of the control thereof, which are capable of making an operation of an operator easily understandable to an audience.

It is another object of the present invention to provide an information processing system, a display control method and a recording medium recorded with a program for an execution of the control thereof, which are capable of making the operator's operation using an external display device connected to the information processing system easily understandable to the audience, and making the operator's operation easily understandable and handleable to the operator himself or herself.

It is still another object of the present invention to provide an information processing system including an input/output device like a touch panel serving as a pointing device incorporating the above function, a display control method and a recording medium recorded with a program for an execution of the control thereof.

To accomplish the above objects, according to the present invention, an information processing system comprises an operation screen unit capable of displaying information and detecting a touch operation on a surface thereof, a first display control unit for controlling display of the information on the operation screen unit, and an operation mode selecting unit for selecting any one of two or more operation modes with respect to the touch operation. The operation mode selecting unit selects the following operation modes.

A first operation mode provides the touch operation on the operation screen unit with a first function corresponding to the touch operation. The touch operation is defined as an operation of selecting a display item by touching such as, e.g., a menu, a button or an icon displayed on the operation screen unit. The first function implies that a specified application program is started up by, e.g., the menu being chosen.

On the other hand, a second operation mode provides the touch operation on the operation screen unit, instead of providing the first function corresponding to the touch operation, or together with providing the first function, with a second function of displaying a marker for indicating a detection of the touch in a touch position.

According to the present invention, the information processing system may further comprise a connecting module for connecting a display device capable of displaying information in addition to the operation screen unit. The first display control unit controls the display of the information on the display device connected to the connecting module and the display of the information on the operation screen unit. In this case also, the second operation mode provides the touch operation on the operation screen unit, instead of providing the first function corresponding to the touch operation, or together with providing the first function, with a second function of displaying a marker for indicating a detection of the touch in at least one of a touch position and a display position on the display device which is determined based on the touch operation.

Herein, the display position on the display device which is determined based on the touch operation is a position on the screen of the display device corresponding to the operation screen unit. For instance, this position is, for example, a position determined as absolute coordinates on the display device, which correspond to absolute coordinates on the operation screen, or a position determined by a relative moving quantity on the screen of the display device that is based on a relative moving quantity by the operation on the operation screen.

According to the present invention, the first display control unit may execute the control so that the information is exclusively displayed on any one of the display device and the operation screen unit. Namely, the first display control unit may control so that the information is displayed on only one of the display device and the operation screen unit.

According to the present invention, the information processing system may further comprise a second display control unit. That is, the first display control unit controls display of a first item of information on the operation screen unit, and the second display control unit controls display of a second item of information on the display device. Based on this, for instance, pieces of information having different contents may be displayed on the operation screen unit and the display device.

Herein, the information having different contents implies what the information displayed on the screen differs as by the menu, the button or the message.

According to the present invention, a control unit for distinguishing between the operation modes on the operation screen unit may be provided as a substitute for the operation mode selecting unit for selecting the operation modes on the operation screen unit with respect to the touch operation.

The control unit makes a judgement to pick up any one of two or more operation modes for the touch operation on the operation screen unit.

Namely, the operation in a first mode is provided with a first function corresponding to this operation, and the operation in a second mode is provided with, instead of providing the first function, or together with providing the first function, a second function of displaying a marker for indicating a detection of the touch in this touch position.

According to the present invention, the information processing system, to which a display unit for displaying information and a pointing device for indicating coordinates on the display unit are connectable, comprises a detection unit for detecting an operator's input operation of indicating the coordinates by use of the pointing device, and a display control unit for displaying a marker for showing the respective coordinates on the display indicated by the input operation. Herein, the display unit capable of displaying the information may embrace a display device such as a display, etc. connected to, e.g., a computer. Further, the pointing device may embrace a device such as a mouse, a track ball, a joy stick, etc., connected to the computer, for indicating the coordinates on the display unit, or a touch panel, etc.

The display control unit may erase the marker after the marker has been displayed for a predetermined time.

The display control unit may, if an elapse time till a posterior coordinate indication since an anterior coordinate indication is longer than the predetermined time (for which the marker continues to be displayed), erase the marker displayed by the anterior coordinate indication and display the marker at the coordinates indicated posteriorly.

According to the present invention, the information processing system may further comprise a display unit, and a connecting module to which other display device on which to set display coordinates corresponding to the coordinates on the display unit, is connected. The display control unit may control display of information on at least one of the display unit and the other display device, and display the marker on at least one of the display unit and the other display device on which the information is being displayed.

According to the present invention, there is provided a readable-by-computer recording medium recorded with a program comprising a step of setting an operation screen unit capable of displaying information and detecting a touch panel on its surface to any one of two operation modes, a step of displaying the information on at least one of the operation screen unit and other display device to be connected to the information processing system, a step of providing the touch operation on the operation screen unit with a first function corresponding to the touch operation in a first operation mode, and a step of providing, in a second operation mode, the touch operation on the operation screen unit, instead of providing the first function corresponding to this touch operation, or together with providing the first function, with a second function of displaying a marker for indicating a detection of the touch in at least one of a touch position and a display position on the display device which is determined based on the touch operation.

According to the present invention, there is provided a readable-by-computer recording medium recorded with a program for making a computer to executes a step of displaying information on at least one of an operation screen unit capable of displaying the information and detecting a touch operation on its surface, and other display device being connected to the computer, a step of detecting the touch operation on the operation screen unit, a step of distinguishing between operation modes on the operation screen unit, a step of providing the operation in a first mode on the operation screen unit with a first function corresponding to the first mode operation, and a step of providing the operation in a second mode on the operation screen unit, instead of providing the first function, or together with providing the first function, with a second function of displaying a marker for indicating a detection of the touch in at least one of a touch position and a display position on the display device which is determined based on the touch operation.

According to the present invention, there is provided a readable-by-computer recording medium recorded with a program for making a computer, to which a display unit and a pointing device can be connected, execute a step of detecting an operator's input operation of indicating the coordinates on the display unit by use of a pointing device, and a step of displaying a marker for showing the respective coordinates on the display unit indicated by the input operation.

This program may further make a computer execute a step of selecting any one of a first operation mode for providing a first function of executing a normal process corresponding to the operator's input operation using the pointing device, and a second operation mode for providing a second function of executing a process different from the first operation mode, and a step of displaying the marker on the basis of the selection of the second operation mode.

This program may further make a computer execute a step of erasing the marker after the marker has been displayed for a predetermined time. Further this program may further make a computer execute a step of calculating an elapse time till a posterior coordinate indication since an anterior coordinate indication, and a step of displaying the marker at the coordinates indicated posteriorly after erasing the marker displayed by the anterior coordinate indication if the elapse time is longer than the predetermined time (for which the marker continues to be displayed).

This program may further make a computer execute a step of controlling the display of the information on at least one of the display unit provided on the computer and other display device, connected to the computer, on which display coordinates corresponding to the coordinates on the display unit are set, and a step of displaying the marker on at least one of the display unit and the other display device on which the information is being displayed.

As discussed above, according to the present invention, instead of providing the function corresponding to the operation of the information processing system, or together with providing the function corresponding to this operation, the marker for indicating the detection of the touch is displayed in the touch position. It is therefore feasible to make the operation of the operator understandable to the audience in the demonstration and the presentation.

Further, in the demonstration and the presentation using the external display device connected to the information processing system, it is possible to make the operator's operation easily understandable and handleable to the operator himself or herself.

DETAILED DESCRIPTION OF THE PREFERRED EMBODIMENTS

Preferred embodiments of the present invention will hereinafter be discussed with reference to the accompanying drawings.

First Embodiment

An information processing system in a first embodiment of the present invention will be described with reference to FIGS. 1 through 7 and 14 through 18.

<Configuration>

Figure 1:
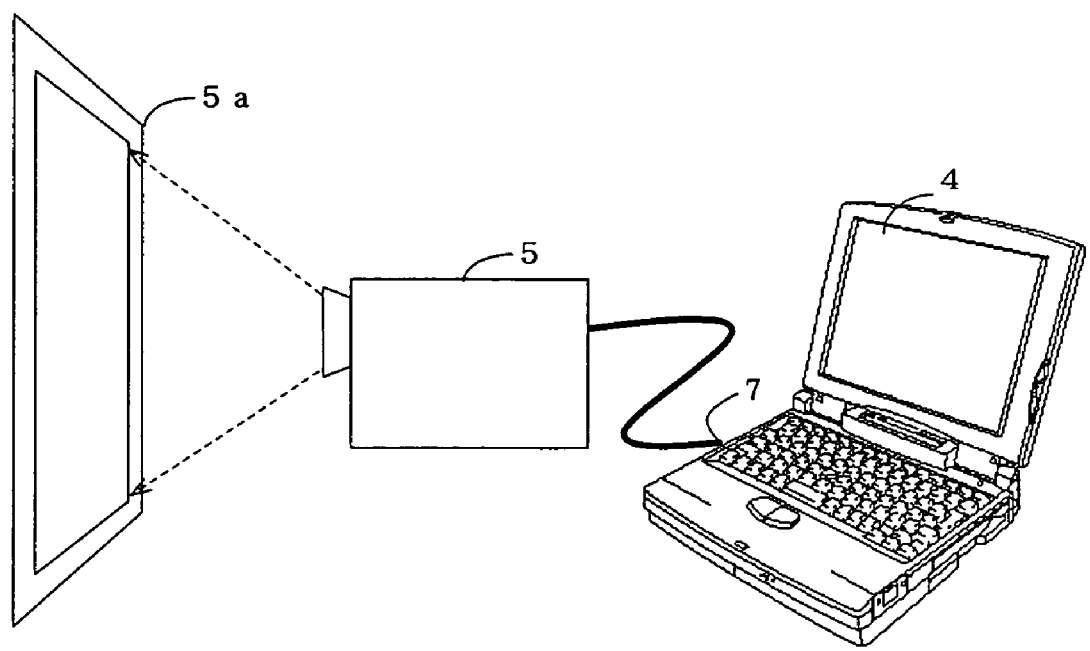
FIG. 1 is a view showing an external configuration of an information processing system in an embodiment of the present invention.

FIG. 1 shows an external configuration of the information processing system in the first embodiment, the information processing system is constructed of a main body including a CPU, a memory, a hard disk, a keyboard, etc., and a touch panel 4 (corresponding to an operation screen unit) with a display unit incorporating a sensor. This information processing system is connectable via an external connecting terminal 7 to an external display device (projector) 5. In this case, information displayed on the touch panel 4 is projected also on a screen 5a.

Figure 2:
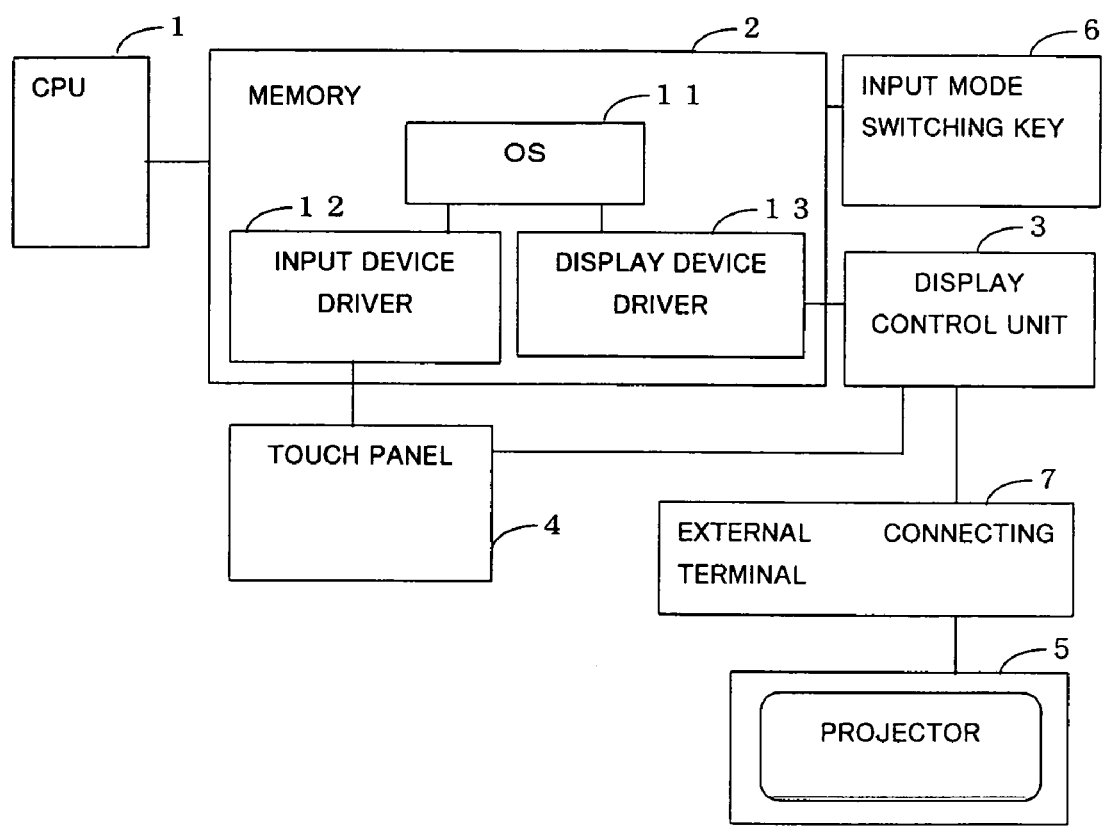
FIG. 2 is a diagram showing functional blocks of the information processing system in the embodiment of the present invention.

FIG. 2 is a block diagram showing functions of the information processing system. The information processing system, as shown in FIG. 2 includes functional blocks such as a CPU 1 (corresponding to a control unit) for executing a program, a memory 2 for storing the program, a touch panel 4 serving as a user interface for displaying output information of the CPU 1 and inputting an instruction to the CPU 1, a display control unit 3 (corresponding to a first display control unit) for generating image information from the output of the CPU 1 and controlling displays on the touch panel 4 and on the projector 5, an external connecting terminal 7 (corresponding to a connecting module) for connecting the projector 5 to the display control unit 3, and an input mode switching key 6 (corresponding to a operation mode selection unit) for switching over an input mode by use of the touch panel 4. Further, the program executed by the CPU 1 contains an OS (Operating System) 11, an input device driver 12 and a display device driver 13. The input device driver 12 and the display device driver 13 correspond to a program of displaying a marker to indicate the detection of a touch.

The CPU 1 provides a user with a function as the information processing system by executing the input device driver 12, the display device driver 13 and a variety of information processing programs.

The memory 2, on which the OS 11, the input device driver 12 and the display device driver 13 are developed, stores those pieces of software.

The touch panel 4 is controlled by the display control unit 3 and thereby displays, on its screen, information of the program executed by the CPU 1, e.g., menus, buttons, icons, messages, etc. Further, when the user pinpoints the indicator such as the menu, or the button or the icon displayed on the screen by use of a touch panel pen 20 (which is hereinafter simply called the pen 20), the touch panel 4 detects coordinates of this pinpoint (touch) position and notifies the CPU 1 of the coordinates thereof by interrupt.

The projector 5 can be connected to the present information processing system via the external connecting terminal 7. The projector 5 is, as in the case of the touch panel 4, controlled by the display control unit 3, and displays the output information of the program executed by the CPU 1. In a state where the projector 5 is not connected, the output information of the program executed by the CPU 1 is displayed on only the touch panel 4.

The display control unit 3 receives the information from the CPU 1, develops this item of information into display data on the screen, e.g., bitmap formatted data such as the menu, the button, the icon, the message, etc., and the thus developed data are displayed on the touch panel 4 and the projector 5 as well.

The input mode switching key 6 is used for switching over an operation mode when the user operates by touching the touch panel 4, i.e., the operation mode for inputting through the touch panel 4. An instruction given by this input mode switching key 6 is stored in the memory 2 and referred to from the OS 11, the input device driver 12 and the display device driver 13.

In a state where the input mode switching key 6 is not pressed down (a first operation mode), when the pen 20 manipulated by the user touches the indicator such as the menu, the button, the icon, etc. on the touch panel 4, the input device driver 12 detects an event occurred upon touching the touch panel 4 (which is hereinafter referred to as a touch event). The input device driver 12 notifies the OS 11 of this touch event and coordinates of the touch position thereof. Further, the OS 11 notifies a predetermined application program of these pieces of data.

As a result, in the first operation mode, the information processing system in the first embodiment provides the user's touch operation (press-down) on the touch panel 4 with a function (corresponding to a first function) corresponding to this touch operation.

In a state where the input mode switching key 6 is pressed down (a second operation mode), when the user presses the indicator such as the menu, the button, the icon, etc. on the touch panel 4 with the pen 20, the input device driver 12 detects a touch event, and notifies the OS 11 of an instruction to display a mark 21 (corresponding to the marker) on the screen and of the display coordinates thereof. The OS 11 thereby indicates the display device driver 13 to display the mark 21 at the display coordinates. While on the other hand, the touch event itself is discarded by the input device driver 12 without the OS 11 being notified of this touch event.

Figure 4:
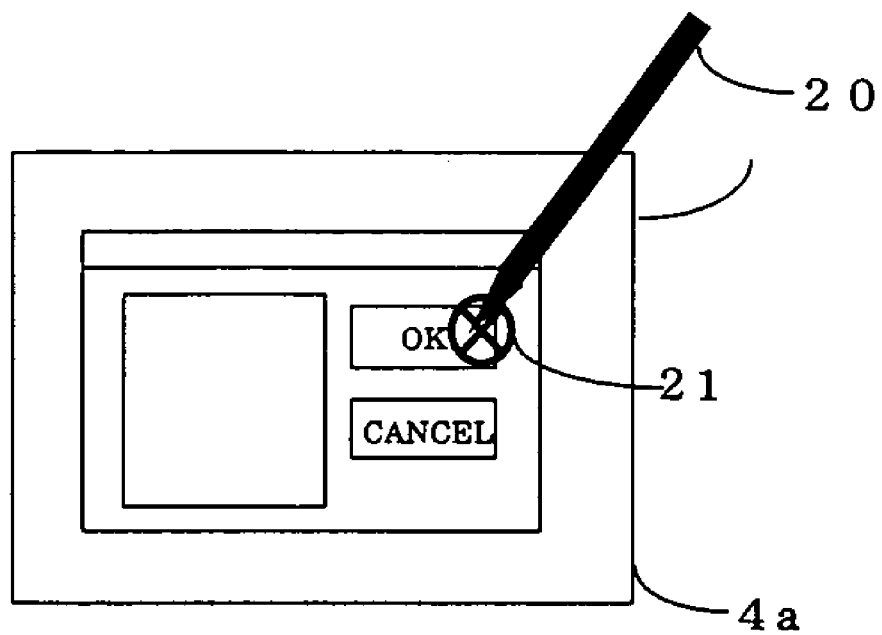
FIG. 4 is a view showing a display example on a screen in the information processing system in the first embodiment.
Figure 4:
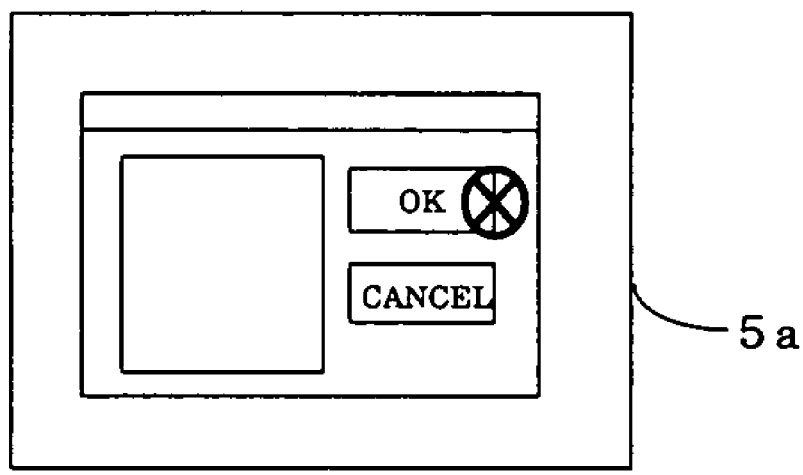

Consequently, as shown in FIG. 4, the information processing system in the first embodiment, in the second operation mode, displays the mark 21 for indicating a detection of the touch in a touch position on the touch panel 4 and in a position on a screen 5a of the projector 5 which corresponds to the above touch position with respect to the touch operation on the screen 4a of the touch panel 4 by using the pen 20 instead of providing the function corresponding to the touch operation (which corresponds to a second function).

The input device driver 12 detects the touch operation on the touch panel 4. Namely, when the user touches the touch panel 4 with the pens 20, the input device driver 12 detects an event occurred by the touch operation (touch event) and a touch position. The input device driver 12, in the first operation mode, notifies the OS 11 of the touch event. On the other hand, the input device driver 12, in the second operation mode, discards this touch event, and notifies the OS 11 of an instruction for displaying the mark 21 and of display coordinates thereof.

The display device driver 13 receives display information displayed on the touch panel 4 and on the projector 5 from the OS 11, and transfers the display information to the display control unit 3.

<Operation>

Figure 14:
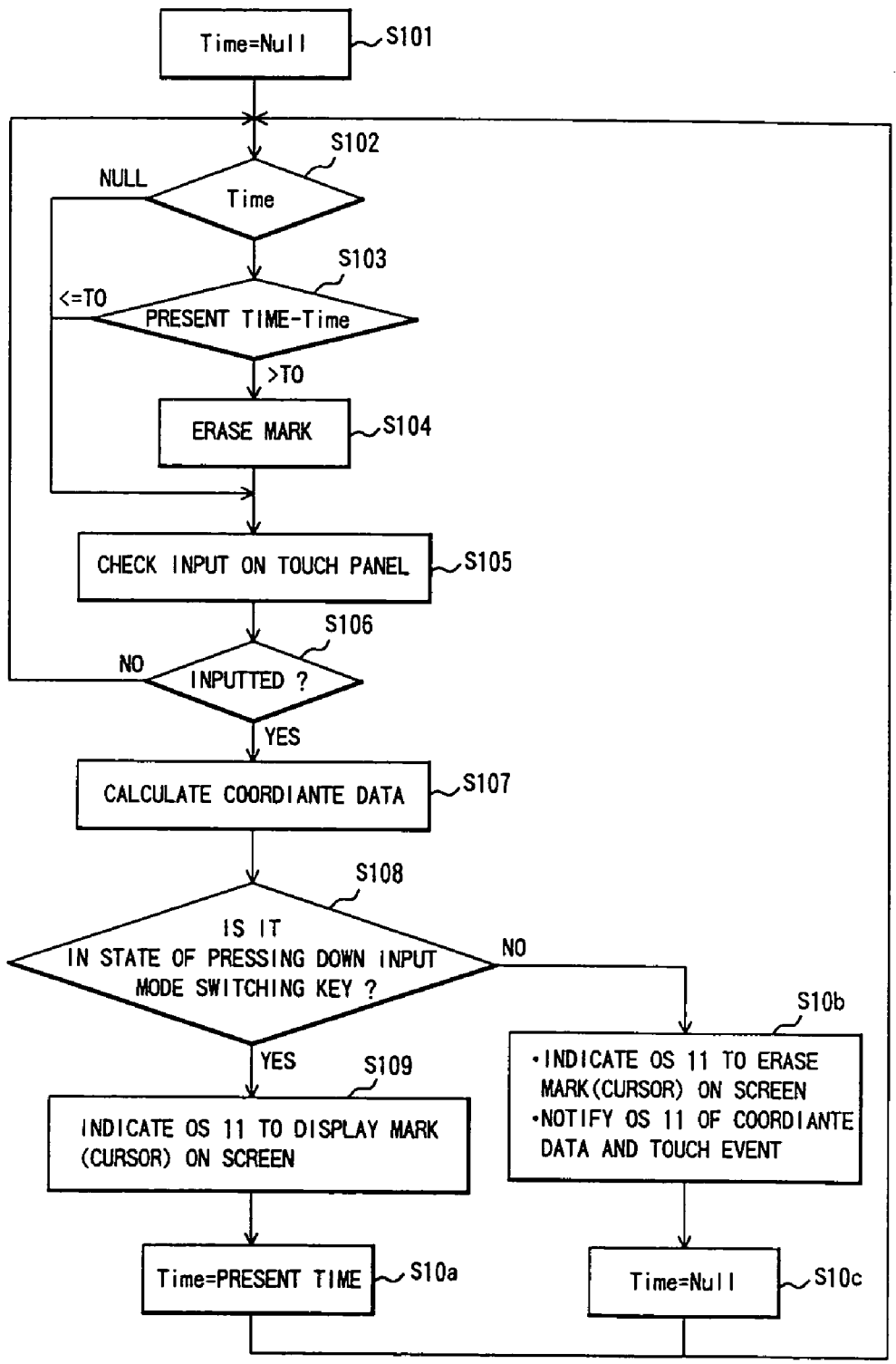
FIG. 14 is a flowchart showing processing steps of a program executed by a CPU 1.

FIG. 14 is a flowchart showing processes of the input device driver 12 executed by the CPU 1 of the information processing system in the first embodiment. The operation of the information processing system will hereinafter be explained referring to the flowchart in FIG. 14.

A register Time for storing a time when the mark 21 was displayed last time, is set beforehand. Null is set in this register Time when erasing the mark 21 being displayed and when in an initializing process. That is to say, a value in Time is cleared.

To start with, the input device driver 12 initializes Time to Null (step S101, of which a representation is hereinafter simplified such as S101).

Next, the input device driver 12 judges whether Time is Null or not (S102).

If Time is not Null, the input device driver 12 compares a difference between the present time and Time with a predetermined value T0 (S103).

As a result of this comparison, if the difference is larger than T0, the input device driver 12 erases the mark 21 being displayed (S104), and checks an input to the touch pane 14 (S105).

If Time is judged to be Null in the process in S102, and if the difference between the present time and Time is judged to be equal to T0 or smaller, the input device driver 12 shifts the control to the process of checking the input to the touch panel 4 in S105.

When the user touches the screen 4*a* of the touch panel 4 by use of the pen 20 (S106), the input device driver 12 detects its touch operation (which is termed an occurrence of the touch event), and further calculates coordinates of a touch position thereof (S107). Moreover, if there is no input to the touch panel 4, the input device driver 12 repeats the processes of checking the value of Time and of erasing the mark 21 in S102 through S104.

Next, after calculating the coordinates of the touch position in S107, the input device driver 12 judges whether or not the input mode switching key 6 is in a press-down state (S108).

If during the press-down, the input device driver 12 judges that the second operation mode occurs, and does not notify the OS 11 of the occurrence of the user's touch event on the screen 4*a* of the touch panel 4. Namely, the input device driver 12, instead of notifying of the occurrence of this touch event, indicates the OS 11 to display the mark 21 (corresponding to the marker for indicating a detection of the touch) for showing the occurrence of the touch event in the touched-by-the-user position on the touch panel 4, or a position, corresponding to this touch position, on the screen 5*a* of the projector 5 (S109).

The OS 11 thereby issues a command to the display device driver 13 to display the mark 21 in the position concerned, whereby the mark 21 is displayed by the display control unit 3 through the display device driver 13.

After displaying the mark 21, the present time is set in Time (S10*a*).

On the other hand, if the input mode switching key 6 is not being depressed (the key 6 is released), the input device driver 12 judges that the first operation mode occurs, and notifies the OS 11 of the information (touch event) showing that coordinates data of the touched-by-the-user position on the touch panel 4 and the touch operation have been detected (S10*b*). Thereafter, Time is set to Null (S10*c*).

The OS 11, when notified of the touch event, to begin with, if the mark 21 is displayed, erases this mark 21. Further, the OS 11 notifies the predetermined application program of the information which the OS 11 itself has been notified of. An essential function of the application program (or the function as the information processing system) is thereby provided.

As discussed above, in the state where the user presses down the input mode switching key 6, the mark 21 indicating that the touch operation in the touch position has been detected, is merely displayed on the screen 5*a* of the projector as well as on the touch panel 4 for a predetermined period of time (the second function), however, the function (the first function) as the information processing system is not provided. While in the state where the user releases the input mode switching key 6, the function (the first function) of the information processing system which corresponds to the touch operation is provided for the touch operation on the touch panel 4.

Therefore, on the occasion of performing demonstration and presentation by use of this information processing system, the operator halts a proceeding of the demonstration, etc. by pressing down the input mode switching key 6, and is thereby able to pinpoint the touch position on the touch panel 4. As a result, an audience can easily follow up with the operation when in the demonstration.

<Modified Example>
<Process of Displaying Mark (Providing Second Function) for Indicating Detection of Touch together with Providing Function of Information Processing System>

The first embodiment has exemplified the information processing system constructed such that in the state where the user (operator) depresses the input mode switching key 6, the mark 21 indicating that the touch operation in the touch position has been detected, is merely displayed on the screen 5*a* of the projector 5 as well as on the screen 4*a* of the touch panel 4 for the predetermined period of time with respect to the touch operation on the touch panel 4, however, the essential function is not provided. Instead of this, the information processing system may also be constructed in such a way that in the state where the user presses down the input mode switching key 6, the mark 21 indicating that the touch operation in the touch position has been detected, is merely displayed on the screen 5*a* of the projector 5 as well as on the screen 4*a* of the touch panel 4 for the predetermined period of time with respect to the touch operation on the touch panel 4, and the essential function as the information processing system may be provided.

Figure 5:
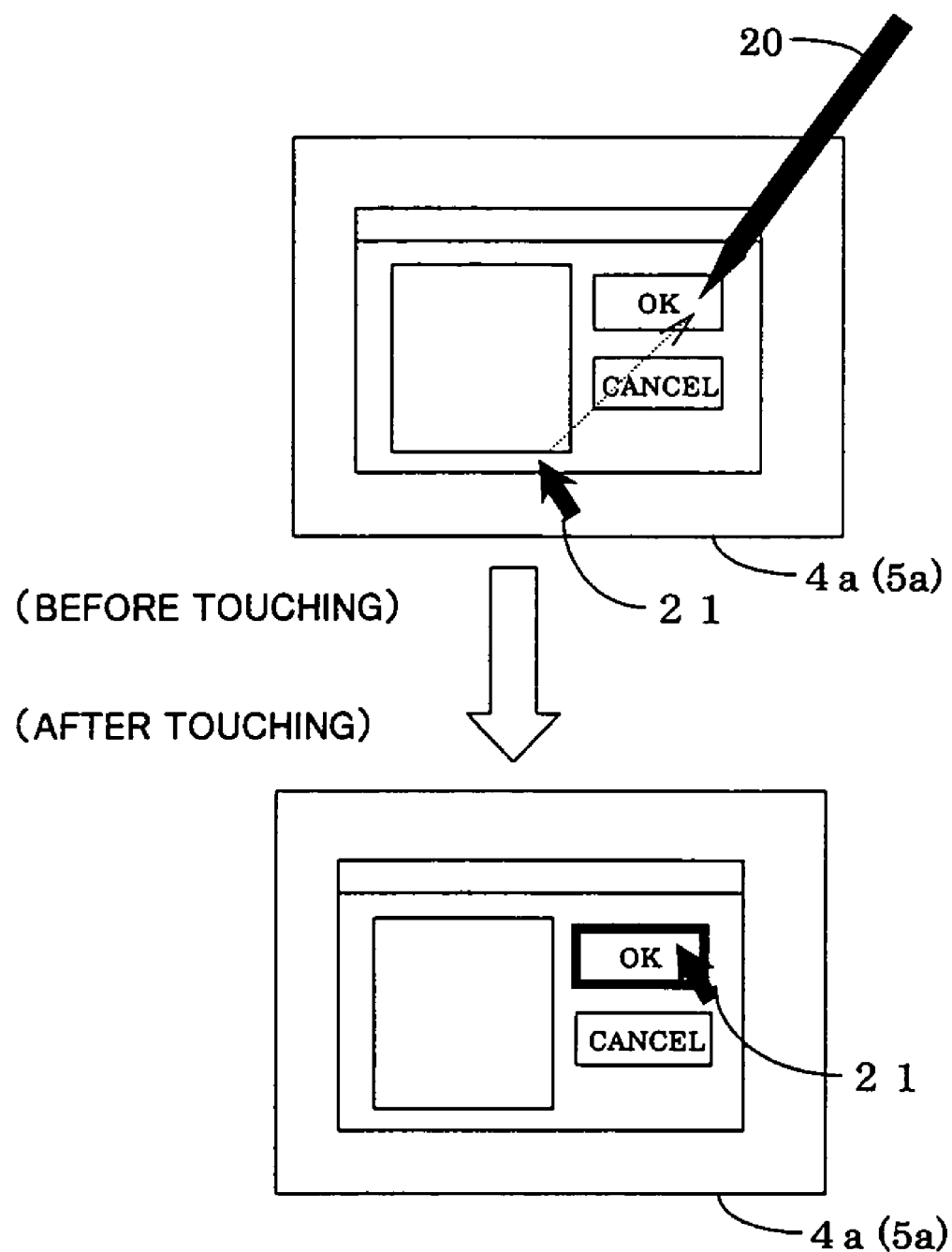
FIG. 5 is a view showing a display example on the screen in the information processing system in the first embodiment.
Figure 15:
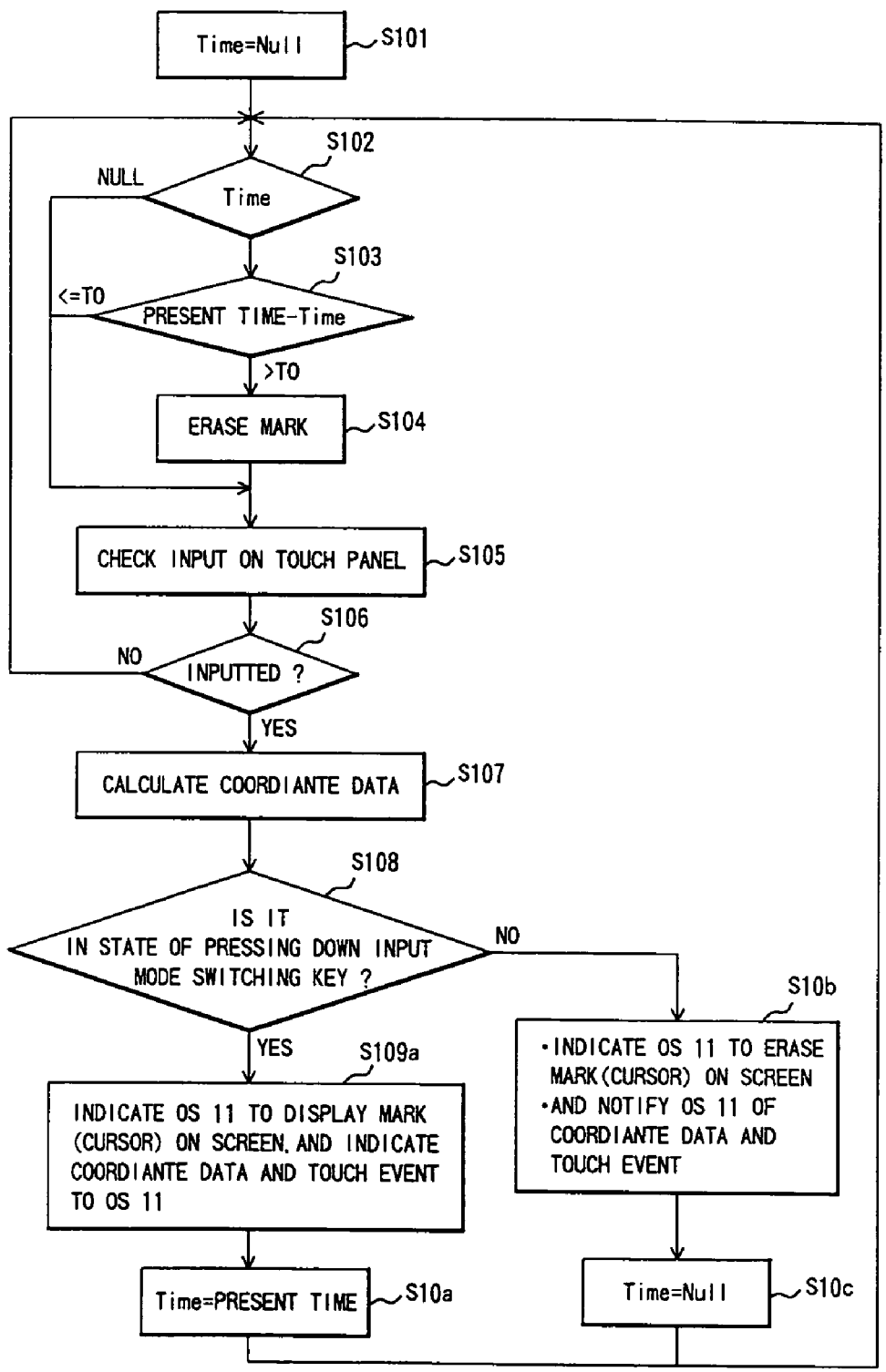
FIG. 15 is a flowchart showing processing steps of a program executed by the CPU 1.

FIG. 5 shows an example of display on the screen in that case. The mark 21 indicates the touch position of the last time on the screen 4*a* (5*a*) before being operated. When the user touches a position on the touch panel 4 with the pen 20, the mark 21 shifts to this touch position, and an OK button existing in this touch position effectively functions. FIG. 15 is a flowchart showing processes in this case.

The processes shown in FIG. 15 are substantially the same as those in FIG. 14, excluding a process in S109*a*. To be specific, if during the press-down of the input mode switching key 6, the input device driver 12 judges that the second operation mode occurs, and notifies the OS 11 of the event occurred by the user's touching the screen 4*a* of the touch panel 4, coordinates data of the touch position on the touch panel 4, and an instruction for displaying the mark 21 (corresponding to the marker for indicating a detection of the touch) on the screen 5*a* of the projector 5 as well as on the screen 4*a* of the touch panel 4 in S109*a*.

Further, the OS 11 notifies the predetermined application program of the touch event and the coordinates data which the OS 11 itself has been notified of. With this operation, the essential function (or the function as the information processing system) of the application program is provided (corresponding to the first function). Further, the OS 11 issues a command to the display device driver 13 to display the mark 21 in the position concerned. Then, the mark 21 is displayed by the display control unit 3 through the display device driver 13 (corresponding to the second function).

As a consequence, when in the demonstration, etc. of the application program, if during the press-down of the input mode switching key 6, the mark 21 indicating the touch position is displayed on the screen 4*a* of the touch panel 4 and on the screen 5*a* of the projector 5 in accordance with the operation on the touch panel 4, with the proceeding of the application program. The audience of the demonstration, etc. is therefore able to easily follow up with the operation of the operator.

In the first embodiment, the first and second operation modes are switched over depending on whether the input mode switching key 6 is being depressed or not. These first and second operation mode may be switched over based on the manipulation mode of the pen 20 on the touch panel 4. The followings are processes of distinguishing between a first mode operation and a second mode operation on the basis of a time interval and a positional interval.

<Modified Example; Process of Distinguishing between Mode Operations by Time Interval>

Figure 6:
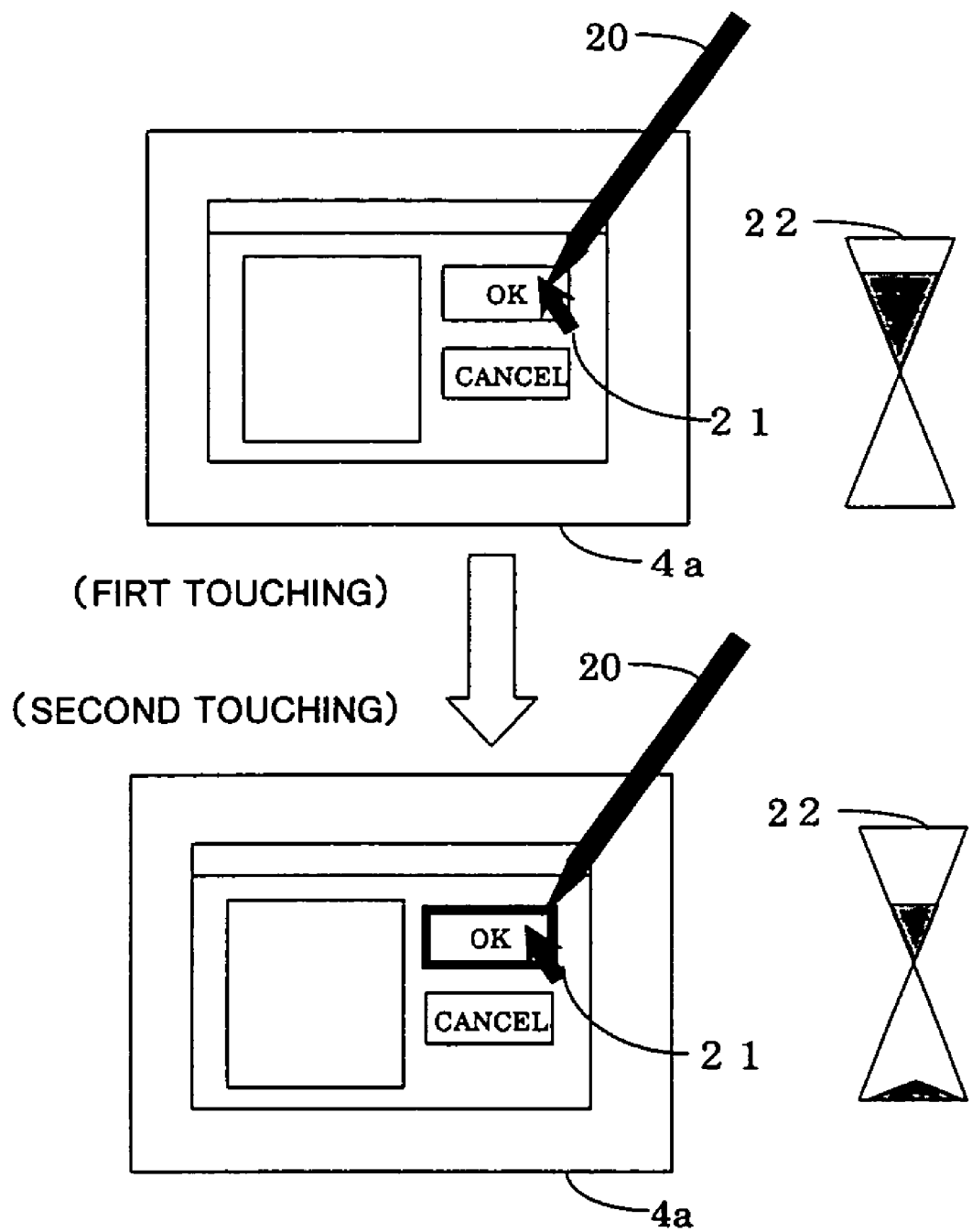
FIG. 6 is a view showing a display example on the screen in the information processing system in the first embodiment.

To start with, FIG. 6 shows an example of a process of switching over the first mode operation and the second mode operation by the time interval of the operation. Referring to FIG. 6, when the user touches the screen 4a of the touch panel 4 by use of the pen 20, the mark 21 is displayed in the touch position. The mark 21 continues to be displayed for a predetermined time indicated by a sand glass 22. If the user touches once again within the period for which the mark 21 is displayed, the operation becomes effective (corresponding to the first mode operation), and the function of the information processing system is provided.

Figure 16:
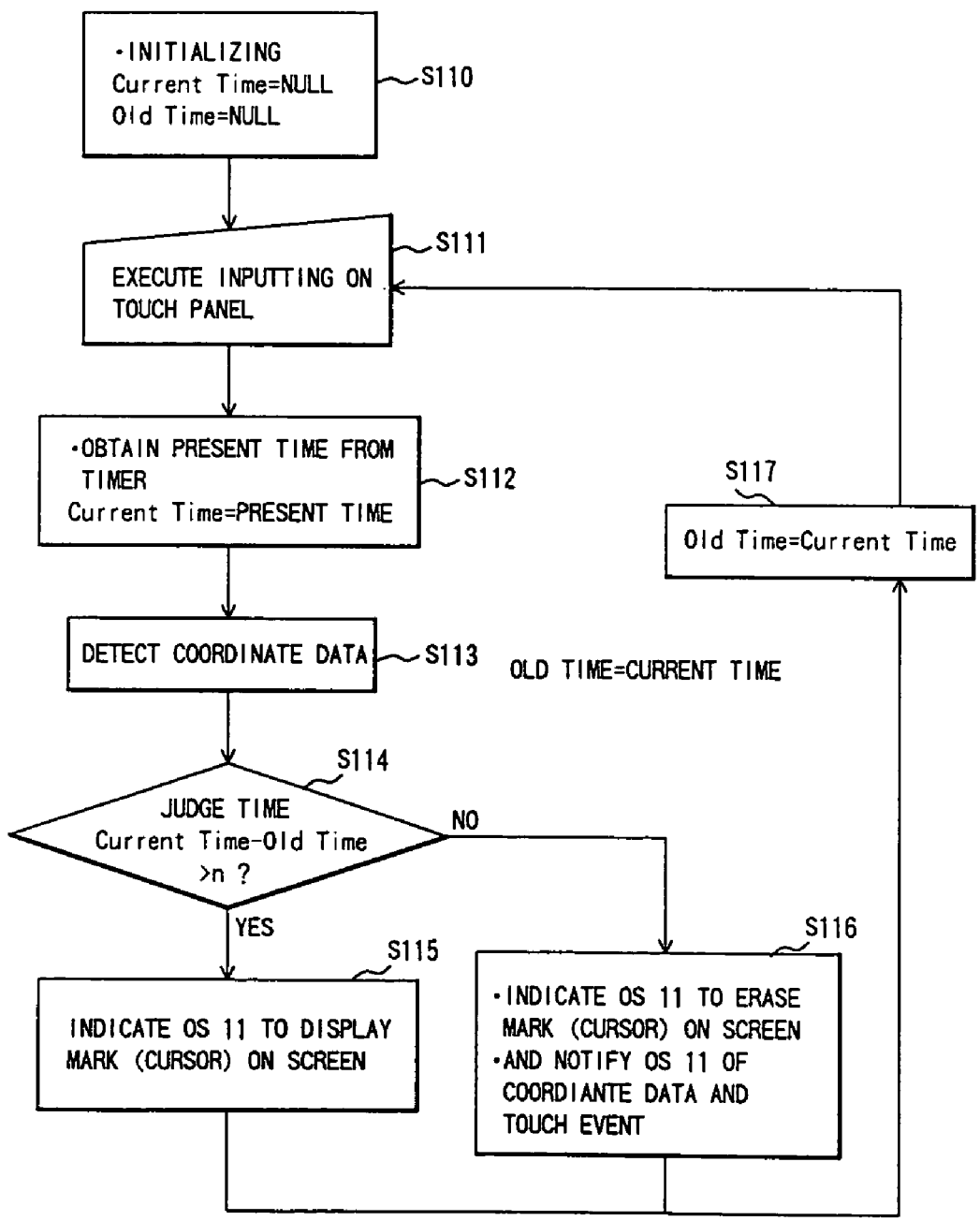
FIG. 16 is a flowchart showing processing steps of a program executed by the CPU 1.
Figure 17:
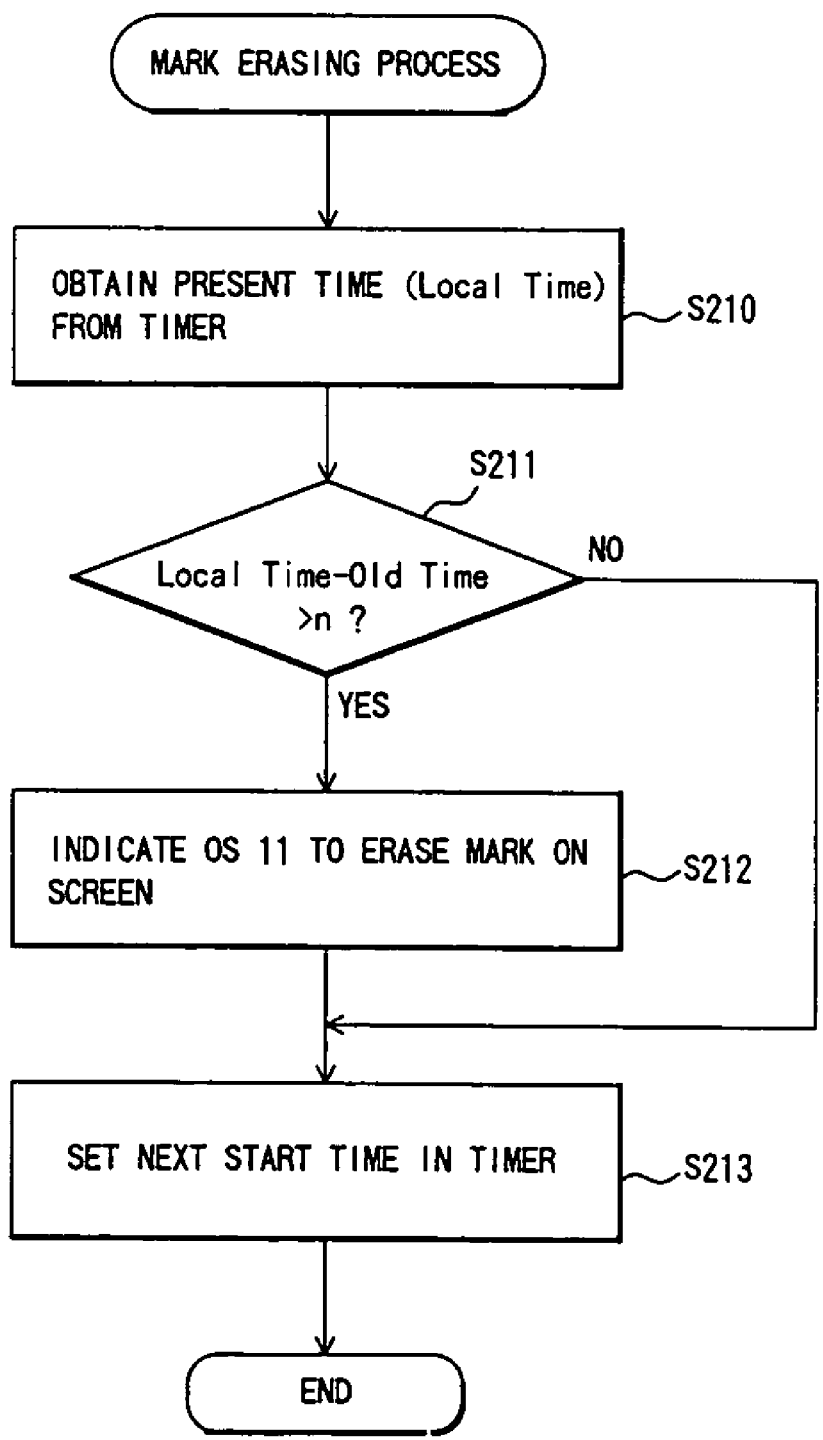
FIG. 17 is a flowchart showing processing steps of a program, started up by a timer, for erasing a mark.

While on the other hand, when a predetermined time elapses since the touch of the first time, the display of the mark 21 disappears. Hence, even if the user touches again the screen with the pen 20 (corresponding to the second mode operation), the mark 21 is merely displayed, but the no function as the information processing system is provided. FIG. 16 is a flowchart showing processes of the input device driver 12 executed by the CPU 1 in that case. Further, FIG. 17 shows processes of a program for erasing the mark 21 after the predetermined time.

In the processing in FIG. 16, at the first onset, a variable CurrentTime stored with a present time and a variable OldTime stored with a time of the last time are initialized (S110). Herein, the variable CurrentTime is defined as a local variable to which only the program shown in FIG. 16 refers. On the other hand OldTime is defined as a global variable to which other programs also refer.

When the user touches the screen 4a of the touch panel 4 by using the pens 20 (S111), the input device driver 12 detects this touch operation, and at first sets the present time to CurrentTime (S112). Next, the input device driver 12 calculates coordinates of the touch position (S113).

Next, the input device driver 12 judges whether or not a predetermined time n elapses till an input operation time (stored in CurrentTime) detected this time is reached since the input operation time (stored in OldTime) detected last time (S114).

Herein, if the predetermined time n elapses, the input device driver 12 judges that the second operation mode occurs, and does not notify the OS 11 of the occurrence of the event of the user's touching the screen 4a of the touch panel 4. That is, the input device driver 12 indicates the OS 11 to display the mark 21 (corresponding to the marker for indicating the detection the touch) for showing the occurrence of the touch event in the touched-by-the-user position on the touch panel 4, and a position, corresponding to this touch position, on the screen 5a of the projector 5 (S115). The OS 11 thereby issues a command to the display device driver 13 to display the mark 21 in the position concerned. Then, the mark 21 is displayed by the display control unit 3 through the display device driver 13. This mark 21 is erased after being displayed for a predetermined time.

Whereas if the predetermined time n does not elapse, the input device driver 12 judges that the first operation mode occurs, and notifies the OS 11 of the information showing that coordinates data of the touched-by-the-user position on the touch panel and the touch operation have been detected (S116).

The OS 11 at first, when the mark 21 is displayed, erases this mark 21. Further, the OS 11 notifies the predetermined application program of the information which the OS 11 itself has been notified of. The essential function of the application program (or the function as the information processing system) is thereby provided.

Moreover, if the touch operation is not detected for the predetermined time after the touch operation of the last time, a timer incorporated into the OS 11 starts up a program for an execution of the processing shown in FIG. 17, thereby erasing the mark 21. This program, upon being started up, at first functions to record the present time in the local variable LocalTime (S210). Next, it is judged whether or not the predetermined time n elapses till the present time (stored in LocalTime) is reached since the input operation time (stored in the global variable OldTime) detected last (S211). If the predetermined time does not elapse, the processing comes to an end. Whereas if the predetermined time elapses, the OS 11 is indicated to erase the mark 21 on the screen (S212). Further, a time when this program should be started up is set (S213), and the processing is finished. Thus, this program is periodically started up by the timer, and repeats the processes described above.

As described above, with respect to the touch operation of the user on the touch panel 4 at the interval of the predetermined time, the mark 21 indicating that the touch operation in the touch position has been detected, is merely displayed on the screen 5a of the projector as well as on the touch panel 4 for the predetermined period of time (the second function), however, the function (the first function) as the information processing system is not provided. On the other hand, for a plurality of touch operations of the user on the touch panel 4 within the interval of the predetermined time, the function (the first function), corresponding to these touch operations, of the information processing system is provided.

Hence, on the occasion of performing the demonstration and presentation by use of this information processing system, the operator halts the proceeding of the demonstration, etc. by controlling the time interval of the touch operation on the touch panel 4, and is thereby able to pinpoint the touch position on the touch panel 4. As a result, the audience can easily follow up with the operation when in the demonstration.

<Modified Example; Process of Distinguishing between Operation Modes by Positional Interval>

Figure 7:
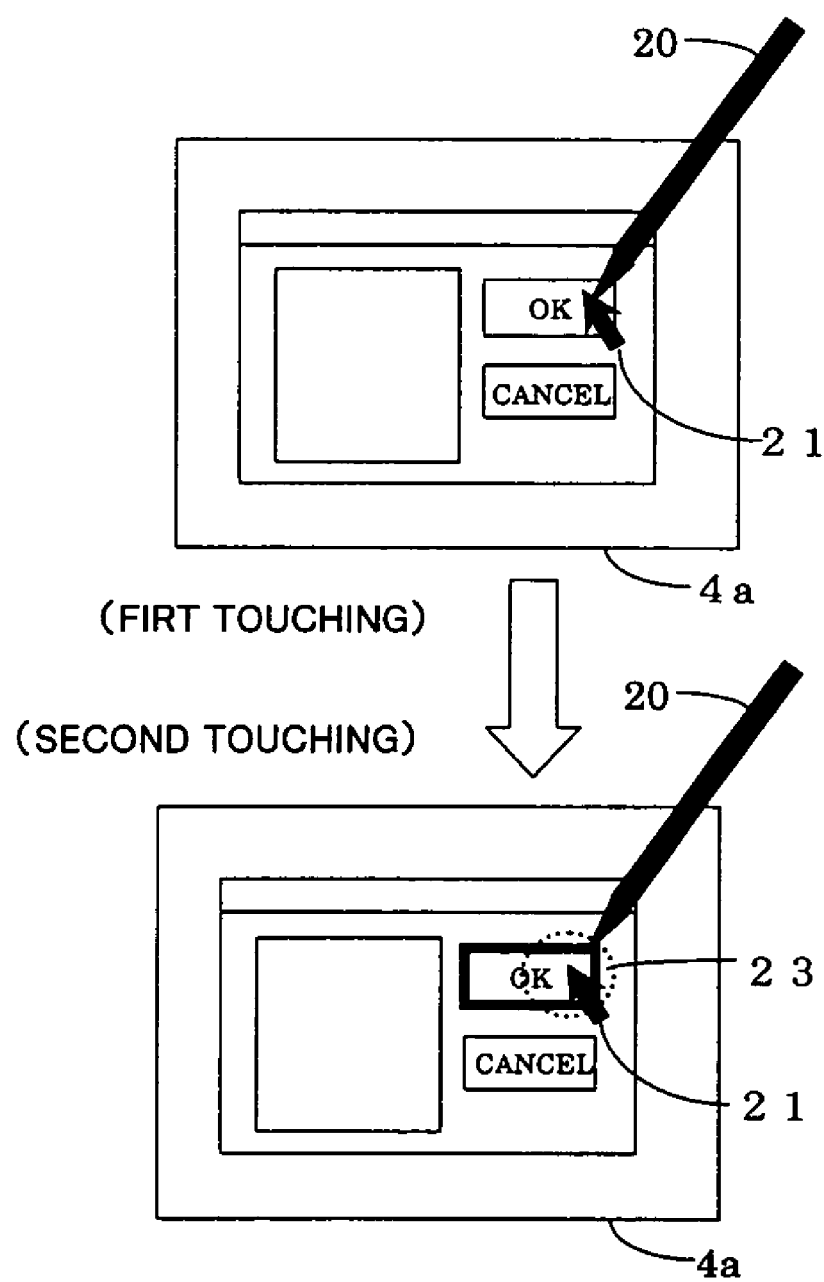
FIG. 7 is a view showing a display example on the screen in the information processing system in the first embodiment.

In the modified example given above, there has been explained the process of the information processing system, by which the first and second mode operations are switched over based on the time interval of the touch operation on the touch panel 4. Instead of this time interval, the mode operations may be switched over by an interval between coordinates of two points touched consecutively. FIG. 7 shows an example of operation in this case.

Figure 18:
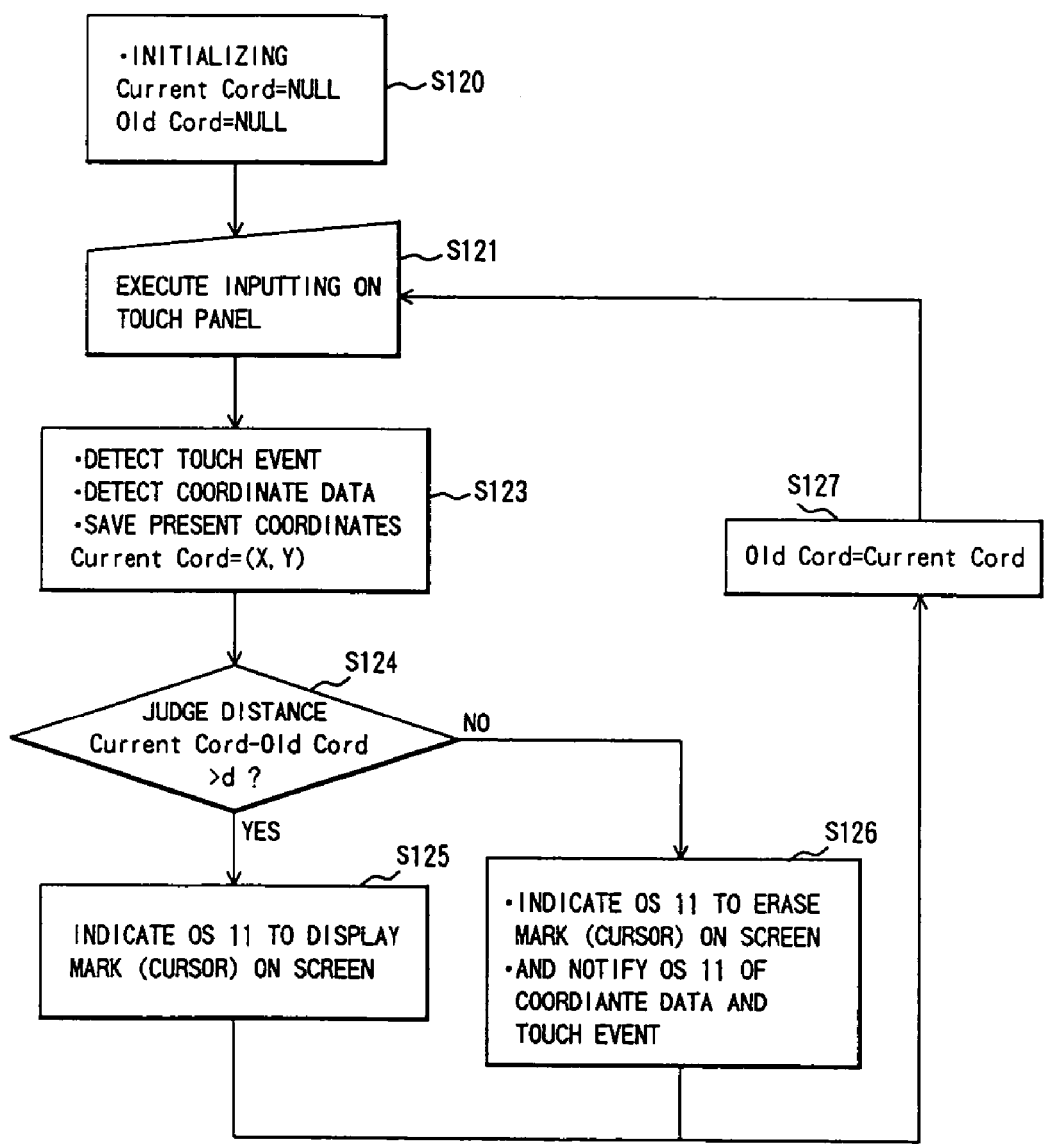
FIG. 18 is a flowchart showing processing steps of a program executed by the CPU 1.

Referring to FIG. 7, when the user touches the screen 4a of the touch panel 4 by using the pen 20, the mark 21 is displayed in this touch position. If the user again touches a position within a range (defined by a dotted line in FIG. 7) of a predetermined distance from the mark 21, the touch operation becomes effective (corresponding to the first mode operation) and the function of the information processing system is provided. On the other hand, even if the user again touches a position away a predetermined distance from the touch position of the first time with the pen 20 (corresponding to the second mode operation), the mark 21 moves to this position and is simply displayed therein, but no function as the information processing system is provided. FIG. 18 is a flowchart showing processes of the input device driver 12 executed by the CPU 1 in that case.

To begin with, the input device driver 12 initializes a variable CurrentCord stored with coordinates of the present touch position and a variable OldCord stored with coordinates of the touch position of the last time (S120).

Next, the input device driver 12 waits for the user's operation on the touch pane 14 (S121). After the user's operation, the input device driver 12 detects and stores the coordinates of this touch position in CurrentCord (S123).

Subsequently, the input device driver 12 compares the coordinates (OldCord) of the touch position of the user with the present coordinates (CurrentCord). Then, the input device driver 12 judges whether or not the present touch position is apart a predetermined distance (d) from the touch position of the last time (S124).

If judged to be apart the predetermined distance (d) from the touch position of the last time, the input device driver 12 judges it as the second mode operation and does not notify the OS 11 of the occurrence of the event by the user's touching as the screen 4a of the touch panel 4. Namely, the input device driver 12, instead of notifying of the occurrence of this touch event, indicates the OS 11 to display the mark 21 (corresponding to the marker for indicating the detection of the touch) in the touched-by-the-user position on screen 4a of the touch panel 4 and a position, corresponding to this touch position, on the screen 5a of the projector 5 (S125).

While on the other hand, if judged to be within the predetermined distance (d) from the touch position of the last time, the input device driver 12 judges it as the first mode operation, and notifies the OS 11 of the touch event indicating that the coordinates data of the touched-by-the-user position on the touch panel 4 and the touch operation thereof have been detected (S126).

As discussed above, even when the user repeatedly touches a position apart the predetermined distance (d) from the touch position of the last time on the touch panel 4, the mark 21 indicating that the touch operation in that touch position is detected, is merely displayed on the screen 4a of the touch panel 4 and on the screen 5a of the projector 5, however, the function as the information processing system is not provided. On the other hand, if the user touches somewhere within the a predetermined distance (d) a plurality of times on the touch panel 4, there is provided the function, corresponding to this operation, of the information processing system.

Therefore, as in the first embodiment, when performing the demonstration and the presentation by use of this information processing system, the operator stops the proceeding of the demonstration, etc. by controlling the position of the touch operation on the touch panel 4, and is able to pinpoint the touch position on the touch panel 4. As a result, the audience can easily follow up with the operation when in the demonstration.

<Other Modified Examples>

In accordance with the first embodiment, in the second mode operation, the input device driver 12, the OS 11 and the display device driver 13 display the mark 21 in the touch position pinpointed by the pen 20. The mark 21 may be displayed by any one of the OS 11 the input device driver 12 and the display device driver 13, or may also be displayed by combining one or more.

Further, those processes may be executed in other programs, e.g., a program layered between the OS 11 and the individual application program (which is termed "Middleware" exemplified by, e.g., a window system for adapting the OS of Character User Interface to Graphical User Interface), or may also be executed in the individual application program.

In the case of executing this process by the Middleware such as the window system, as by the information processing system in the first embodiment, the function in the first embodiment is actualized uniformly by all the application programs using this window system, etc. While on the other hand, even when the above process is attained by the individual application program, what the function thereof is actualized is limited to that application program.

The first embodiment discussed above have exemplified the operation mode in which the touch panel is touched by the pen 20, however, the present invention is not limited to this mode. For instance, the touch panel 4 touched by a human finger may also be used.

The information processing system in the modified example given above involves the use of the time interval of touching the touch panel 4 or the interval between the touch positions in order to distinguish between the operation modes, however, the present invention is not confined to these intervals. The information processing system may distinguish between the operation of the first mode and the operation of the second mode on the basis of, for example, a time length of one touch kept on the touch pane 14, the touch operation similar to double-clicks and triple-clicks of the mouse) performed consecutively a plurality of times in the same position, a trajectory (e.g., whether a closed curve is included or not) of the manipulation of the pens 20 on the screen 4a, and so forth.

Second Embodiment

The information processing system in a second embodiment of the present invention will hereinafter be described with reference to FIGS. 8 through 11. FIGS. 8 to 11 show display examples of the screen 4a of the touch panel provided in this information processing system and of the screen 5a of the projector 5.

The configuration of the information processing system and the processing of the programs in the second embodiment are the same as those in the first embodiment, and will be explained referring to FIGS. 2 and 14 through 18 as the necessity may arise.

As described above, the configuration of this information processing system is illustrated in FIG. 2 as in the first embodiment. The display control unit 3 in FIG. 2 in the second embodiment is, however, incapable of displaying the information on the touch panel 4 in a state where the projector 5 is connected. Therefore, the user executes the touch operation on the screen 4a of the touch panel 4 on which no information is displayed as illustrated in FIGS. 8 to 11.

Figure 8:
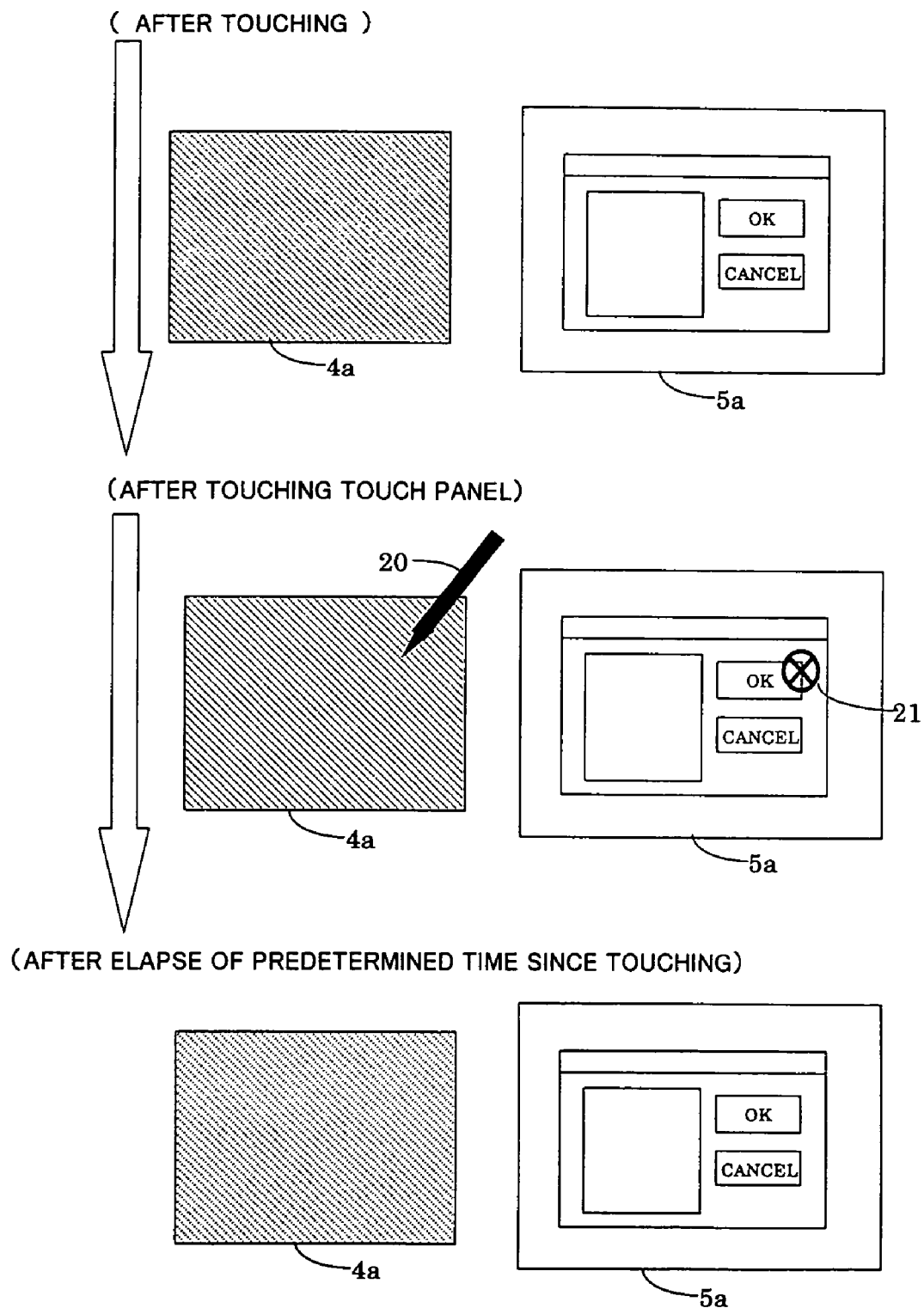
FIG. 8 is a view showing a display example on the screen in the information processing system in a second embodiment.

FIG. 8 shows an example (corresponding to the second operation mode) in which the user operates the input mode switching key 6 by pressing down this key 6. In this state, when the user touches the screen 4a of the touch panel 4 by using the pen 20, the mark 21 (corresponding to the marker) is displayed on a corresponding position on the screen 5a of the projector 5. Further, when a predetermined time elapses since the touch operation, the mark 21 is erased.

On the other hand, the information processing system, when the user releases the input mode switching key 6, provides the essential function (corresponding to the first operation mode).

This process can be executed as shown in a flowchart in FIG. 14 in the same way in the first embodiment. As described above, the user is, after looking at the mark 21 displayed on the screen 5a of the projector 5 and thus confirming the corresponding position on the screen 4a of the touch panel 4, able to operate a desired menu, button or icon.

<Modified Example>

Figure 9:
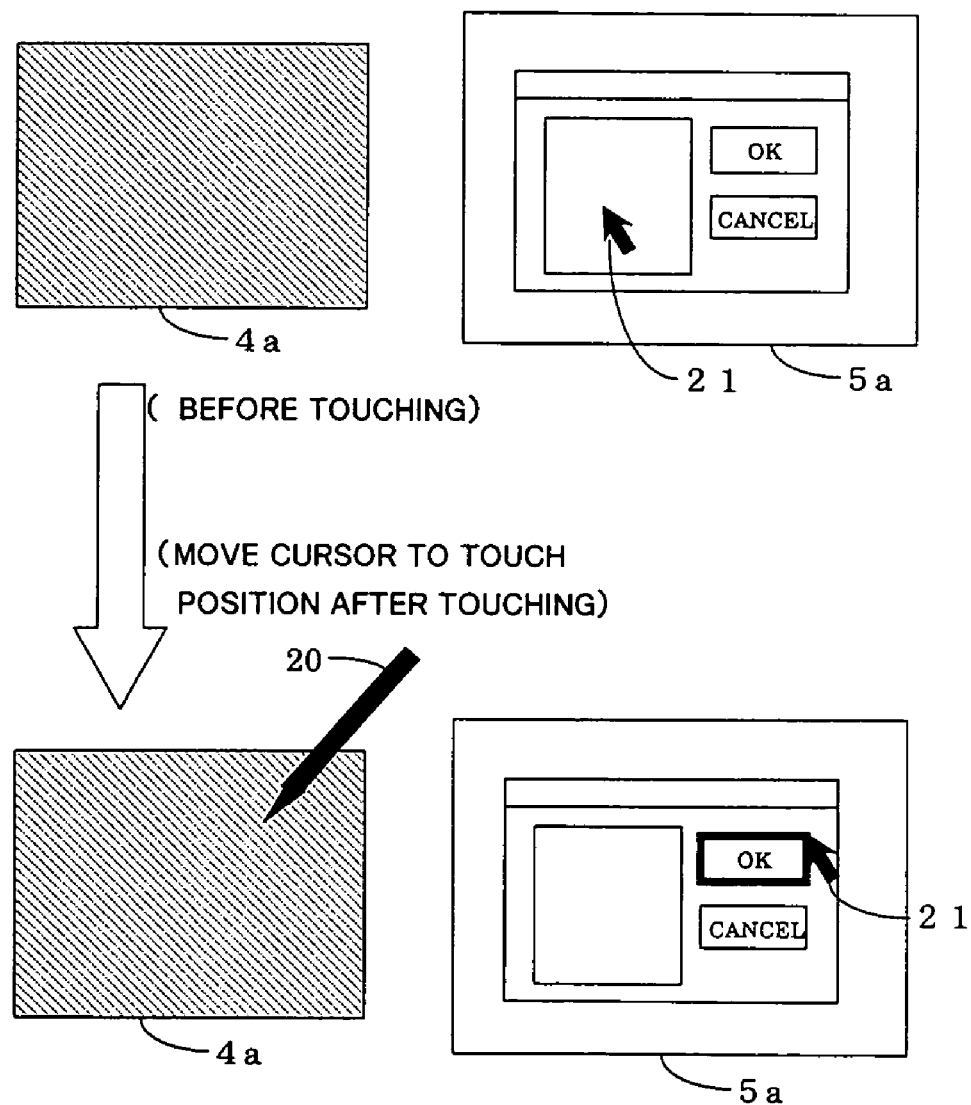
FIG. 9 is a view showing a display example on the screen in the information processing system in the second embodiment.

FIG. 9 shows an example of the display screen on which to display the touch position on the touch panel 4 as well as of providing the function as the information processing system. To be specific, in the state where the user presses down the input mode switching key 6 (the second operation mode), the mark 21 is displayed in the touch position of the last time on the screen 5a of the projector 5. In this state, when the user newly touches the screen 4a of the touch panel 4 with the pen 20, the mark 21 moves to a position, corresponding to this touch position, on the screen 5a of the projector 5, and a function (corresponding to a function indicated by the marker) corresponding to the position of the mark 21, is provided.

While in the state where the user does not depress the input mode switching key 6 (the first operation mode), the mark 21 is not displayed on the screen 5a of the projector 5. In this state, when the user touches the screen 4a of the touch panel 4 with the pen 20, there is provided a function, corresponding to this operation, of the information processing system. This process is executed as shown in a flowchart in FIG. 15 in the same manner in the first embodiment.

Figure 10:
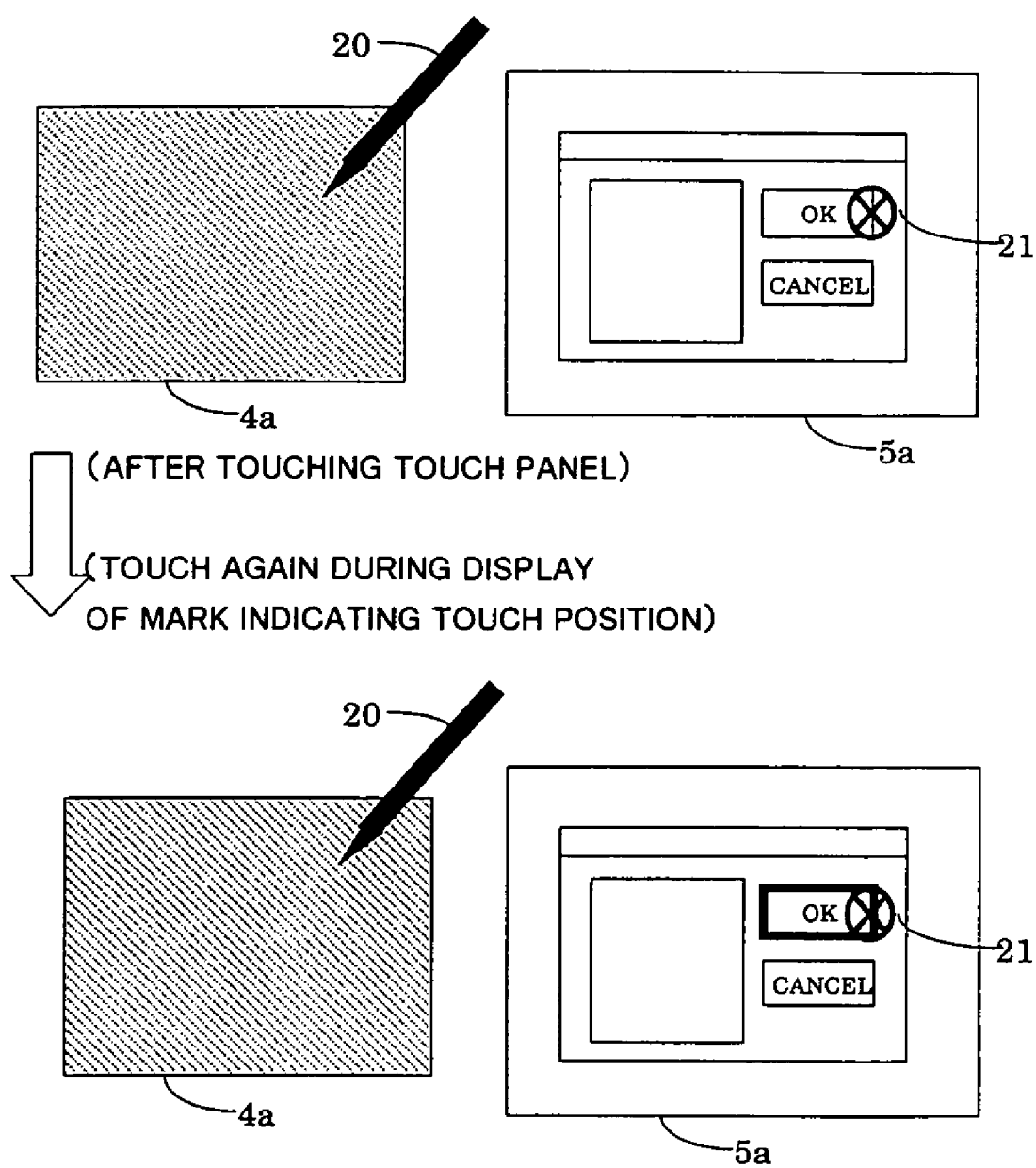
FIG. 10 is a view showing a display example on the screen in the information processing system in the second embodiment.

FIG. 10 shows an example of distinguishing between the operation modes on the basis of the time interval of the touch operation. Namely, when the user touches the screen 4a of the touch panel 4, the mark 21 is displayed. The mark 21 disappears after the predetermined time has passed. If the user gain effects the touch operation once gain during the display of this mark 21, the operation becomes effective (the first mode operation) and the essential function as the information processing system is provided.

While on the other hand, even when the user touches the screen once again after the mark 21 has disappeared (the second mode operation), the mark 21 is merely displayed again, and no function corresponding to this operation as the information processing system is provided. This process is executed based on flowcharts in FIGS. 16 and 17 as in the first embodiment.

Thus, when the user implements the demonstration and the presentation by using the information processing system, the user halts the proceeding of the demonstration, etc. by controlling the time interval of the touch operation on the touch panel 4, and is thereby able to pinpoint the touch position on the touch panel 4. As a result, the audience can easily follow up with the operation when in the demonstration. Further, the user is, after looking at the mark 21 displayed on the screen 5a of the projector 5 and thus confirming the corresponding position on the screen 4a of the touch panel 4 by controlling the time interval of the touch operation, able to operate a desired menu, button or icon.

Figure 11:
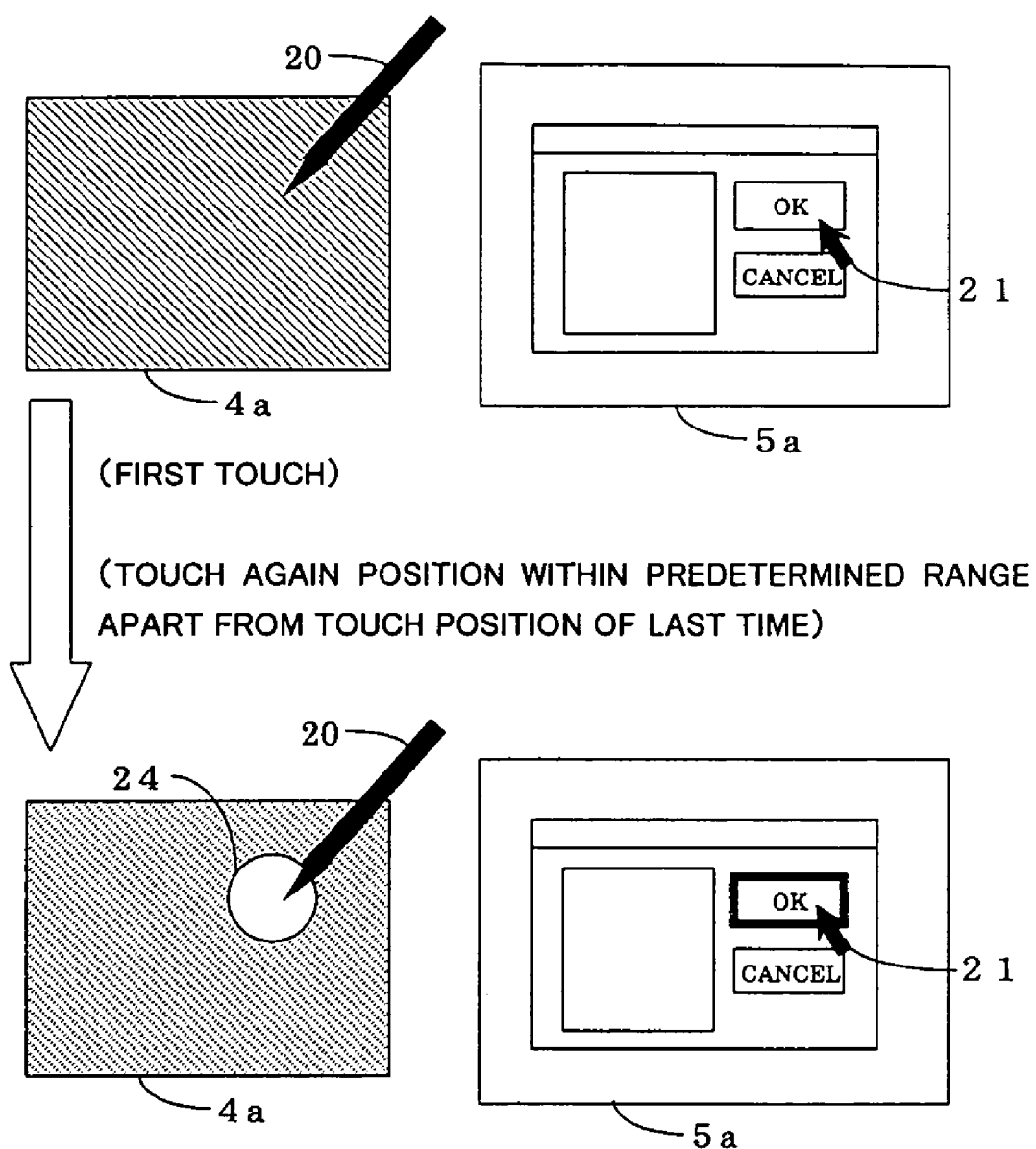
FIG. 11 is a view showing a display example on the screen in the information processing system in the second embodiment.

FIG. 11 shows an example of distinguishing between the operation modes on the basis of a distance of the touch position. To be specific, when the user touches the screen 4a of the touch panel 4, the mark 21 is displayed in a corresponding position on the screen 5a of the projector 5. Next, when the user again touches a region (indicated by a circle 24 in FIG. 11) within a predetermined distance from the touch position, there is provided the essential function, corresponding to this touch operation, of the information processing system (the first mode operation).

While on the other hand, even when the user touches again a position apart the predetermined distance or farther from the display position of the mark 21 (the second mode operation), the mark 21 simply moves to this position, there is provided no function corresponding to this touch operation as the information processing system.

This process is executed based on a flowchart in FIG. 18 in the same way in the first embodiment. As discussed above, the user is, after looking at the mark 21 displayed on the screen 5a of the projector 5 and thus confirming the corresponding position on the screen 4a of the touch panel 4 by controlling the distance between the consecutive touch positions, able to operate a desired menu, button or icon.

Third Embodiment

Figure 3:
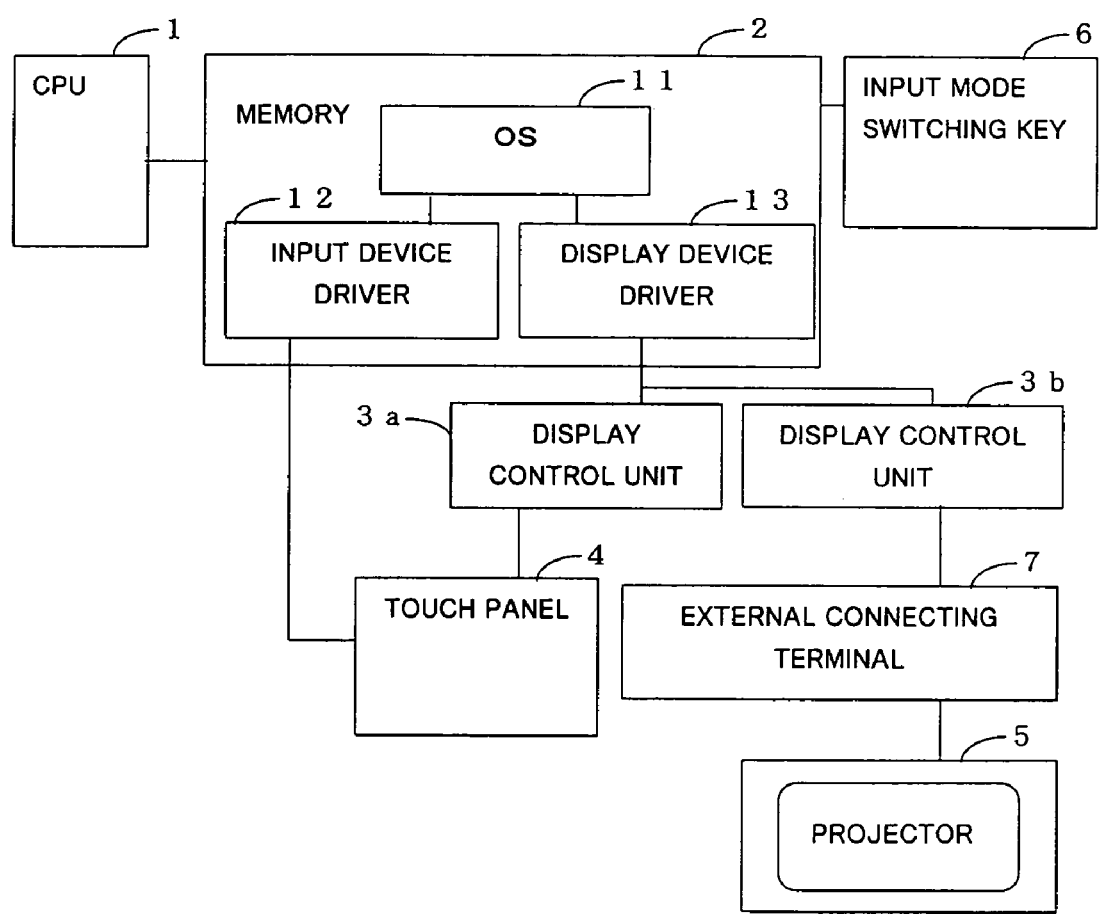
FIG. 3 is a diagram showing functional blocks of the information processing system in a third embodiment of the present invention.
Figure 12:
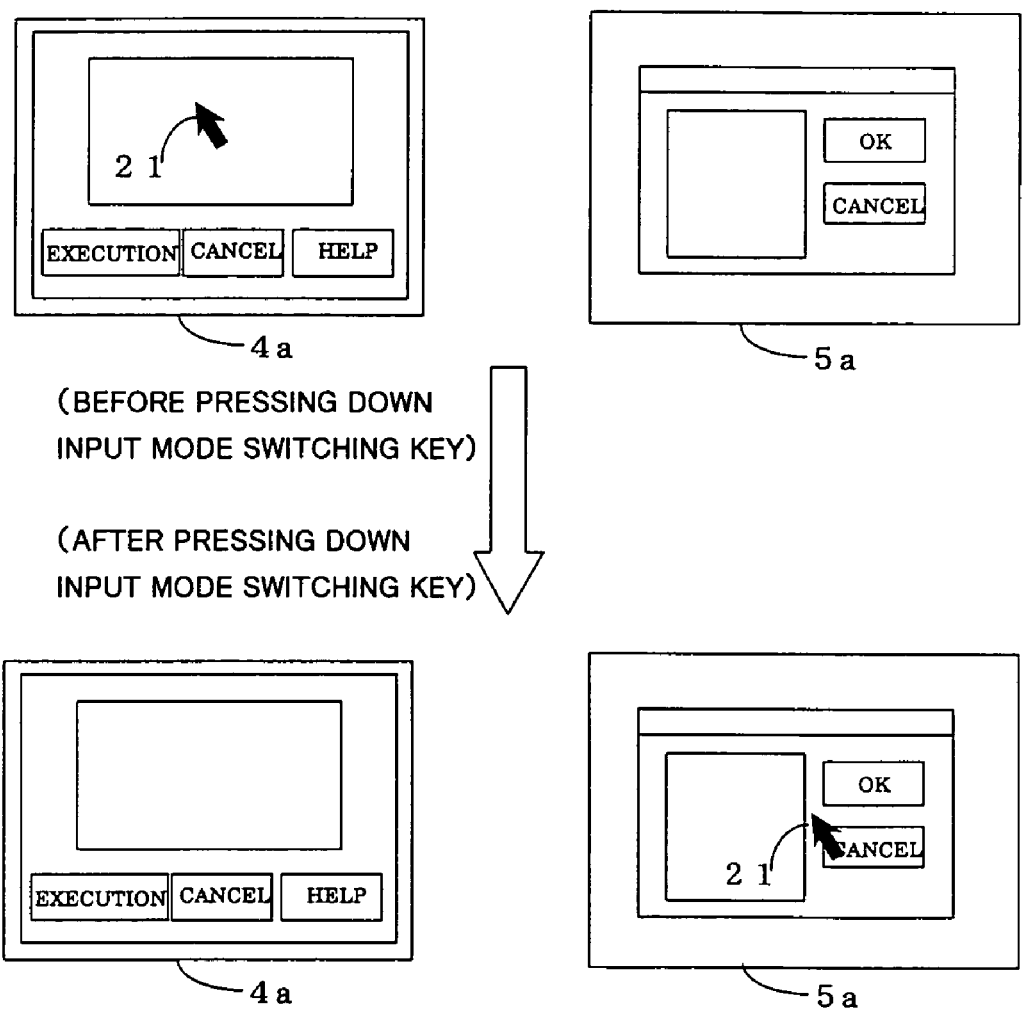
FIG. 12 is a view showing a display example on the screen in the information processing system in the third embodiment.
Figure 13:
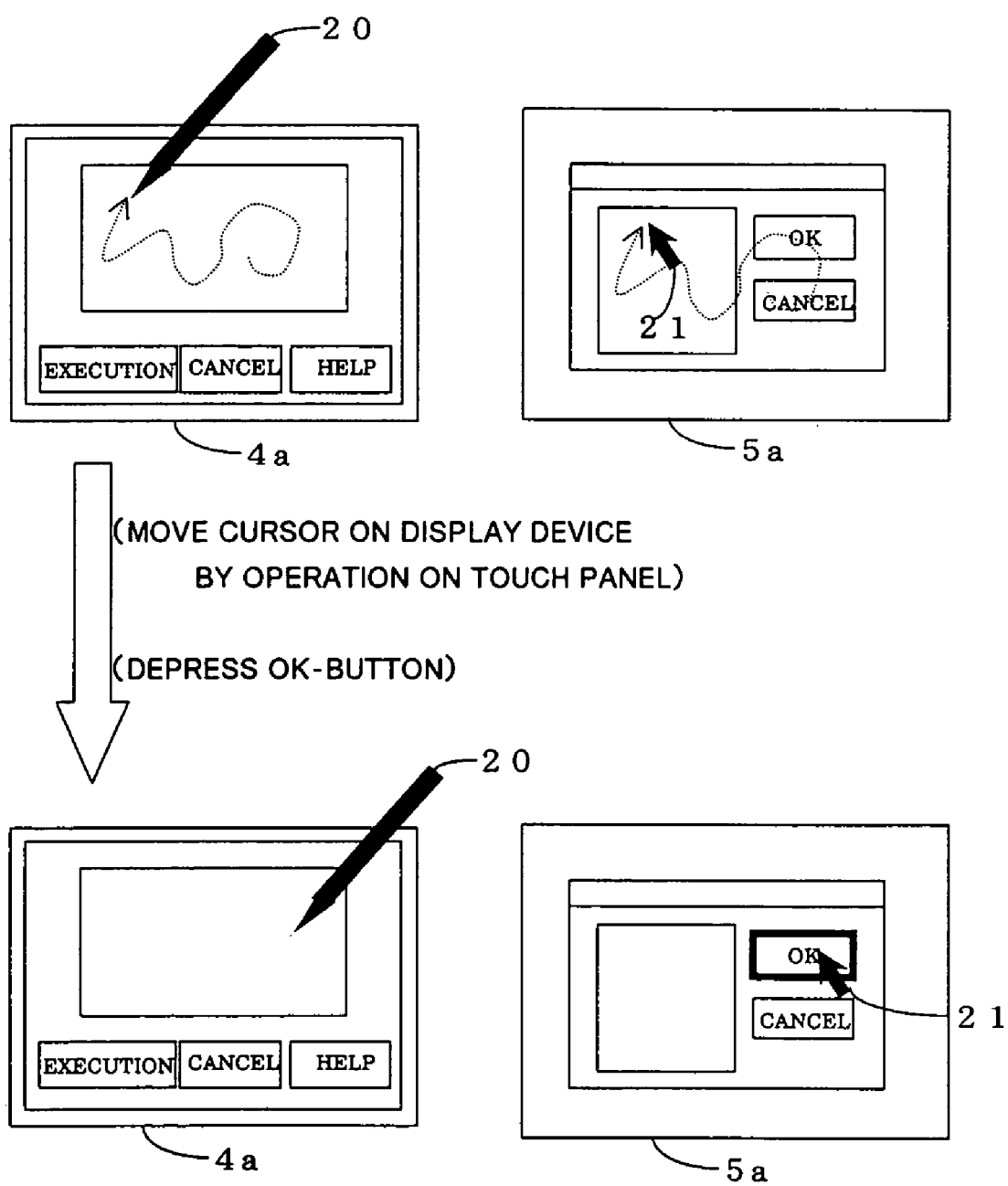
FIG. 13 is a view showing a display example on the screen in the information processing system in the third embodiment.

The information processing system in a third embodiment of the present invention will hereinafter be described with reference to FIGS. 3, 12 and 13. FIG. 3 is a functional block diagram of the information processing system. FIGS. 12 and 13 show display examples of the screen 4a of the touch panel and of the screen 5a of the projector 5.

As shown in FIG. 3, the information processing system includes two pieces of display control units 3a and 3b. Other configurations are the same as those in the first embodiment. The same components are marked with the like numerals, of which the repetitive explanations are omitted.

As illustrated in FIG. 3, the display control unit 3a (corresponding to a first display control unit) controls the display on the touch panel 4, while the display control unit 3b (corresponding to a second display control unit) controls the display on the projector 5. Accordingly, the information processing system in the third embodiment is capable of displaying different items of information such as the menus buttons, icons or messages between the touch panel 4 and the projector 5.

FIG. 12 shows an example where the display of the mark 21 is switched over between the screen 4a of the touch panel 4 and the screen 5a of the projector 5, depending on a state of pressing down the input mode switching key 6. Specifically, in the state where the input mode switching key 6 is not depressed (corresponding to the first operation mode), the mark 21 is displayed on the screen 4a of the touch panel 4. In this state, the menu, the button, the icon, etc. on the touch panel 4 can be operated.

While in the state where the input mode switching key 6 is depressed (corresponding to the second operation mode), the mark 21 is displayed in a position on the screen 5a of the projector 5, which corresponds to the touch position of the last time on the screen 4a of the touch panel 4. In this state, as shown in FIG. 13, the manipulation of the pen 20 on the screen 4a of the touch panel 4 is displayed as it is on the screen 5a of the projector 5. In this state, the movement of the mark 21 on the screen 5a of the projector 5 is controlled by the operation on the touch panel 4.

That is to say, the mark 21 moves to the position on the projector 5, which corresponds to the touch position on the touch panel 4. The user touches the touch panel and is thereby able to operate the menu, the button or the icon which are different from those on the touch panel 4 and displayed on only the screen 5a of the projector 5 by touching the touch panel. The user is therefore able to be provided with a function (corresponding to the function indicted by the marker) of the application program which is displayed on only the screen 5a.

<Modified Example>

The information processing system in the third embodiment is constructed so that the coordinates on the touch panel 4 and the coordinates on the projector are set in a one-to-one correspondence, and the mark 21 displayed on the screen 5a of the projector 5 is moved. Instead of this mode, the movement of the mark 21 displayed on the screen 5a of the projector 5 may be controlled by, when the pens 20 is slid on the touch panel 4, relatively calculating how far and where the mark 21 should be moved to on the basis of a displacement (moving distance and direction) of the pen 20.

Fourth Embodiment

The input device driver 12 and the display device driver 13 explained in the first embodiment, or the Middleware such as the window system explained in <Other Modified Example>, may be recorded on a readable-by-computer recording medium, and read by a computer, thereby executing those pieces of software together with the OS 11 and the variety of application programs incorporated into the computer. The information processing system in a fourth embodiment can be thus actualized.

Namely, in the embodiment of the present invention, the operation mode of the information processing system using the operation screen unit (e.g., the touch panel 4) on which the information can be displayed and the touch operation on the surface can be detected, is set to any one of the first and second operation modes. Then, the information is displayed on at least one of the operation screen unit and the projector 5 as the different one, and the touch operation is detected via the operation screen unit.

The first operation mode provides the touch operation via the operation screen unit with the first function corresponding to this touch operation.

In the second operation mode, instead of providing the touch operation via the operation screen unit with the first function corresponding to this touch operation, or together with providing the first function, the program for displaying the marker for indicating the detection of the touch in at least one of the above touch position and the display position on the projector 5 which is determined based on the above touch operation, is recorded on the readable-by-computer recording medium, and read and executed by the computer. In this case, the whole of the OS 11 or the window system is not necessarily recorded on the recording medium.

The readable-by-computer recording medium given herein embraces recording mediums on and from which the information such as data and programs can be stored electrically, magnetically, optically, mechanically or chemically and read by the computer. Those recording mediums may be, e.g., a floppy disk, a magneto-optic disk, a CR-ROM, a CD-R/W, a DVD, a DAT, an 8 mm tape, a memory card, etc. Further, the above program is stored in a hard disk and a memory of the computer and can be downloaded into other computers via communications lines. As a result, the computer downloaded with the input device driver 12 and the display device driver 13 or the Middleware such as the window system, etc. can be made to function as the information processing system in the fourth embodiment.

As the information processing system in the embodiment of the present invention, there has been exemplified the hardware architecture of the typical computer, wherein the program of the present invention which is recorded on the hard disk is developed on the memory and executed by the CPU. The embodiment of the present invention is not limited to this hardware architecture. The present invention can be embodied with such a computer hardware architecture that, for example, the program of the present invention is recorded not on the hard disk but on a ROM and executed by the CPU.

Fifth Embodiment

Figure 19:
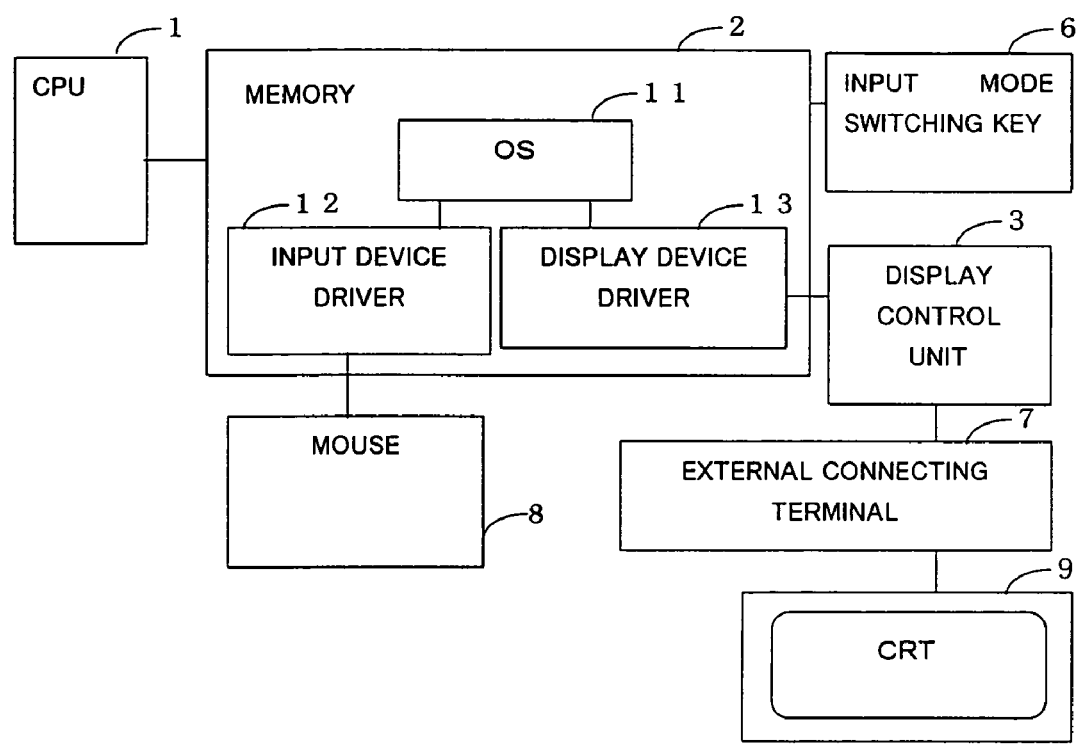
FIG. 19 is a diagram showing functional blocks of the information processing system in a fifth embodiment of the present invention.

The first to third embodiments discussed above have exemplified the information processing system involving the use of the touch panel 4 as a pointing device, however, the present invention is not necessarily confined to this type of pointing device. In the information processing system using, e.g., a mouse as the pointing device, a coordinate indication of the mouse used by the operator, i.e., an input of the coordinate indication by, e.g., clicking the button thereof, is detected, and the mark 21 according to the present invention may be displayed in a position of the coordinates detected above. FIG. 19 is a functional block diagram showing a case in which a mouse 8 is used as the pointing device, and a CRT 9 is used as a display device. Other components in FIG. 19 are the same as those in FIG, 1 and marked with the line numerals, of which the repetitive explanations are omitted. Note that a much larger size of projector may be connected to the system architecture shown in FIG. 19.

The mark 21 in the fifth embodiment is not a mouse cursor following up with the movement of the mouse 8 but a mark (corresponding to the marker) that pinpoints the position given when the button of the mouse 8 is pressed down (clicked).

The audience is thereby able to follow up with the operation of the operator and easily understand the method of operating the information processing system and the application programs as well.

What is claimed is:

1. An information processing system, comprising:
    an operation screen unit displaying information and detecting a touch operation on a surface thereof;
    a first display control unit controlling display of the information on said operation screen unit; and
    an operation mode selecting unit selecting any one of two or more operation modes with respect to the touch operation, and
    wherein a first mode is settable to provide a first function corresponding to the touch operation including a touch position without displaying a predetermined shape marker indicative of a detection of a touch in the touch position if the touch operation is detected on said operation screen unit, said first function triggering a command corresponding to an option located at the touch position, and
    a second mode is settable to provide a second function of displaying the predetermined shape marker indicative of the detection of the touch in the touch position if the touch operation is detected on said operation screen unit, without executing the first function corresponding to the touch operation including the touch position.

2. An information processing system according to claim 1, further comprising:
    a connecting module for connecting a display device capable of displaying information in addition to said operation screen unit,
    wherein said display device is connected via said connecting module,
    said first display control unit controls the display of the information on said display device and the display of the information on said operation screen unit, and
    the second mode is settable to provide a second function of displaying a marker for indicating a detection of the touch in at least one of a touch position and a display position on said display device which is determined based on the touch operation if the touch operation is detected on said operation screen unit, the second function is provided instead of the first function or together with the first function.

3. An information processing system according to claim 2, wherein said first display control unit executes the control so that the information is exclusively displayed on any one of said display device and said operation screen unit.

4. An information processing system according to claim 1, further comprising:
a connecting module for connecting a display device capable of displaying information in addition to said operation screen unit, and
a second display control unit,
wherein said display device is connected via said connecting module,
said first display control unit controls display of a first item of information on said operation screen unit,
said second display control unit controls display of a second item of information on said display device, and
the second mode is settable to provide a second function of displaying a marker for indicating a detection of the touch in at least one of a touch position and a display position on said display device which is determined based on the touch operation if the touch operation is detected on said operation screen unit, the second function is provided instead of the first function or together with the first function.

5. An information processing system comprising:
an operation screen unit displaying information and detecting a touch operation on a surface thereof;
a first display control unit controlling display of the information on said operation screen unit; and
a control unit controlling an execution mode and a display mode on said operation screen unit, and
wherein when the execution mode is selected, a command of an option located at a touch position corresponding to the touch operation detected on said operation screen unit is executed without displaying a predetermined shape marker indicative of a detection of the touch position of the touch operation, and
when the display mode is selected, the predetermined shape marker indicative of the detection of a touch of the touch operation detected on said operation screen unit is displayed, without executing the command corresponding to the touch operation.

6. An information processing system according to claim 5, further comprising:
a connecting module for connecting a display device capable of displaying information in addition to said operation screen unit,
wherein said display device is connected via said connecting module,
said first display control unit controls the display of the information on said display device and the display of the information on said operation screen unit, and
the display mode displays a marker for indicating a detection of the touch in at least one of a touch position and a display position on said display device which is determined based on the touch operation if the touch operation is detected on said operation screen unit, and the command corresponding to the touch operation is not executed.

7. An information processing system according to claim 6, wherein said first display control unit executes the control so that the information is exclusively displayed on any one of said display device or said operation screen unit.

8. An information processing system according to claim 5, further comprising:
a connecting module for connecting a display device capable of displaying information in addition to said operation screen unit, and
a second display control unit,
wherein said display device is connected via said connecting module,
said first display control unit controls display of a first item of information on said operation screen unit,
said second display control unit controls display of a second item of information on said display device, and
the display mode displays a marker for indicating a detection of the touch in at least one of a touch position and a display position on said display device which is determined based on the touch operation if the touch operation is detected on said operation screen unit, and the command corresponding to the touch operation is not executed.

9. An information processing system connected with a display unit displaying information and a pointing device for indicating coordinates on said display unit, said system comprising:
a detection unit detecting an operator's input operation indicating the coordinates by use of said pointing device;
a display control unit controlling display of a predetermined shape marker indicative of the detected coordinates on said display unit in accordance with the operator's input operation; and
an operation mode selecting unit selecting any one of a first operation mode for providing a first function of executing a normal command corresponding to the operator's input operation using said pointing device without displaying the predetermined shape marker indicative of a detection of a touch in a touch position of the operator's input operation, and a second operation mode for displaying the marker for a predetermined time without executing the normal command corresponding to the operator's input operation using the pointing device, where said normal command executes an option located at the touch position of said input operation.

10. An information processing system according to claim 9, wherein said display control unit executes a control for erasing the marker after the marker has been displayed for a predetermined time.

11. An information processing system according to claim 10, wherein said display control unit, if an elapse time till a posterior coordinate indication since an anterior coordinate indication is longer than the predetermined time, executes the control for erasing the marker displayed by the anterior coordinate indication and controls displaying of the marker at the coordinates indicated posteriorly.

12. An information processing system according to claim 9, wherein said pointing device is a touch panel provided on said display unit.

13. An information processing system according to claim 9, further comprising:
a connecting module to which other display device on which to set display coordinates corresponding to the coordinates on said display unit, is connected,
wherein said display control unit controls display of information on at least one of said display unit and said other display device, and controls displaying of the marker on at least one of said display unit and said other display device on which the information is being displayed.

14. A method of controlling an information processing system connected with a display device that has an operation screen unit displaying information and detecting a touch operation on a surface thereof, said method executing operations when no information is displayed on said operation screen unit, the operations comprising:
   detecting the touch operation on the surface of said operation screen unit;
   displaying a predetermined shape marker in a coordinate position on said display device that corresponds to a position of the detected touch on said surface of operation screen unit; and
   detecting the position of a mode selection switch; and
   if the mode selection switch is in a first position having an option, executing a function indicated by the marker on said display device to provide the option without displaying the predetermined shape marker, and if the mode selection switch is in a second position continuing to display the predetermined shape marker in the coordinate position on said display device for a predetermined time without executing the function indicated by the marker on said display.

15. A storage medium readable by a machine, tangibly embodying a program of instructions executable by the machine to perform processing in response to user instruction using an operation screen unit, the method comprising:
   setting an information processing system including an operation screen unit displaying information and detecting a touch operation on a surface thereof in response to any one of two or more operation modes; and
   displaying the information on at least one of said operation screen unit and other display device connected with the information processing system,
   wherein the operation modes include:
   a first mode settable to provide a first function corresponding to the touch operation including a touch position without displaying a predetermined shape marker indicative of a detection of a touch in the touch position if the touch operation is detected on said operation screen unit, said first function triggering a command of an option provided at the touch position, and
   a second mode settable to provide a second function of displaying the predetermined shape marker indicative of the detection of the touch operation in at least one of a touch position on the operation screen unit and a corresponding display position on said display device, which is determined based on the touch operation if the touch operation is detected on said operation screen unit, where the second function is provided without the first function or together with the first function.

16. A storage medium readable by a computer, tangible embodying a program of instructions executable by the computer to perform a method for processing in response to user instruction using an operation screen unit, the method comprising:
   displaying information on at least one of an operation screen unit displaying the information and detecting a touch operation on a surface thereof, and another display device connected with the computer;
   detecting the touch operation on the surface of said operation screen unit;
   distinguishing between operation modes on said operation screen unit;
   wherein the operation modes include:
   a first mode settable to provide a first function corresponding to the touch operation including a touch position without displaying a predetermined shape marker indicative of a detection of a touch in the touch position if the touch operation is detected on said operation screen unit, said first function triggering a command of an option provided at the touch position, and
   a second mode is settable to provide a second function of displaying the predetermined shape marker indicative of the detection of the touch in at least one of a touch position and a corresponding display position on said display device which is determined based on the touch operation if the touch operation is detected on said operation screen unit, where the second function is provided without the first function or together with the first function.

17. A storage medium readable by a machine that is connected with a display unit, storing a program of instructions executable by the machine to perform a method for processing in response to a user instruction using the display unit, the method comprising:
   detecting an operator's input operation of indicating coordinates on a display unit by use of a pointing device;
   displaying a predetermined shape marker showing the indicated coordinates on said display unit; and
   selecting any one of a first operation mode for providing a first function of executing a normal process corresponding to the operator's input operation using said pointing device without displaying a predetermined shape marker indicative of a detection of a touch in the touch position, and a second operation mode for displaying the marker in the coordinate position on said display unit for a predetermined time, and without executing the function indicated by the marker on said display, where said normal command executes an option located at the touch position of said input operation.

18. A storage medium readable by a machine tangible embodying a program according to claim 17, of instructions executable by the machine, the method further comprising:
   erasing the marker after the marker has been displayed for a predetermined time.

19. A storage medium readable by a machine tangible embodying a program according to claim 18, of instructions executable by the machine, the method further comprising:
   calculating an elapse time till a posterior coordinate indication since an anterior coordinate indication; and
   displaying the marker at the coordinates indicated posteriorly after erasing the marker displayed by the anterior coordinate indication if the elapse time is longer than the predetermined time.

20. A storage medium readable by a machine tangible embodying a program according to claim 17, of instructions executable by the machine, wherein said pointing device is a touch panel provided on said display unit, and
   said detecting an operator's input operation is a process of detecting an operator's coordinate indicating operation on said touch panel.

21. A storage medium readable by a machine tangible embodying a program according to claim 17, of instructions executable by the machine, the method further comprising:
   controlling the display of the information on at least one of said display unit provided on said computer and other display device, connected to said computer, on which display coordinates corresponding to the coordinates on said display unit are set; and displaying the marker on at least one of said display unit and said other display device on which the information is being displayed.

22. An information processing system, comprising:

an operation screen unit displaying information and detecting a touch operation by a user on a surface thereof; and a display control unit controlling display of the information on the operation screen unit, where a first mode is settable to display a predetermined shape marker indicative of a touch corresponding to a touch position of the detected touch operation, and a second mode is settable to execute a command of an option located at the touch position without displaying the marker indicative of the detection of the touch.

23. A display method of an information processing system, comprising:

switchably processing information of a touch operation having a touch position, where a first mode executes a function triggering a selectable option provided at the touch position without displaying a predetermined shape marker indicative of a detection of the touch position of the touch operation when the touch operation is detected, and a second mode displaying the predetermined shape marker indicative of the detection of the touch position of the touch operation without executing the function of the touch operation.

24. A display method of an information processing system, comprising:

executing a first mode triggering a function of a menu provided at a position of a touch operation upon detection of the touch operation in an operation window displaying a first content; and executing a second mode displaying a marker indicating a location of the touch position including coordinates thereof in the operation window upon the detection of the touch operation to enable a second content having the marker to be displayed in the operation window.

* * * * *